United States Patent
Kazmi et al.

(10) Patent No.: US 10,009,782 B2
(45) Date of Patent: Jun. 26, 2018

(54) CONFIGURATION OF MOBILITY MANAGEMENT MEASUREMENT METHOD

(71) Applicant: Telefonaktiebolaget LM Ericsson (publ), Stockholm (SE)

(72) Inventors: Muhammad Kazmi, Bromma (SE); Bengt Lindoff, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 71 days.

(21) Appl. No.: 15/025,145

(22) PCT Filed: Sep. 22, 2014

(86) PCT No.: PCT/EP2014/070106
§ 371 (c)(1),
(2) Date: Mar. 25, 2016

(87) PCT Pub. No.: WO2015/044078
PCT Pub. Date: Apr. 2, 2015

(65) Prior Publication Data
US 2016/0242052 A1 Aug. 18, 2016

Related U.S. Application Data

(60) Provisional application No. 61/884,488, filed on Sep. 30, 2013.

(51) Int. Cl.
*H04B 17/00* (2015.01)
*H04W 24/08* (2009.01)
(Continued)

(52) U.S. Cl.
CPC .......... *H04W 24/08* (2013.01); *H04L 5/0005* (2013.01); *H04W 24/10* (2013.01); *H04W 76/046* (2013.01); *H04W 84/18* (2013.01)

(58) Field of Classification Search
CPC .............................. H04W 24/08; H04W 24/10
(Continued)

(56) References Cited

U.S. PATENT DOCUMENTS

2009/0318090 A1 12/2009 Flordelis et al.
2011/0199923 A1* 8/2011 Persson ................. H04W 24/10
370/252

(Continued)

FOREIGN PATENT DOCUMENTS

WO 2013049997 A1 4/2013
WO 2013137811 A1 9/2013

OTHER PUBLICATIONS

PCT International Search Report, dated Feb. 5, 2015, in connection with International Application No. PCT/EP2014/070106, all pages.
(Continued)

*Primary Examiner* — Charles C Jiang
*Assistant Examiner* — Will Lin
(74) *Attorney, Agent, or Firm* — Leffler Intellectual Property Law, PLLC

(57) ABSTRACT

A method of a network node of a cellular communication network connectable to one or more wireless communication devices is disclosed. The method comprises (for each of one or more cells of the cellular communication network) transmitting a respective measurement configuration message to at least one of the wireless communication devices, wherein each measurement configuration message comprises an instruction that the wireless communication device should use a particular signal quality measurement method, the particular signal quality measurement method being selected from a group of available signal quality measurement methods comprising a first signal quality measurement method wherein measurements are made based on a first number of symbols and a second signal quality measurement method wherein measurements are made based on a second number of symbols. The method further comprises receiving one or more signal quality measurement reports from respective ones of the wireless communication devices, wherein each signal quality measurement report comprises
(Continued)

an indication of a result of signal quality measurements performed by the respective wireless communication device. Corresponding method of a wireless communication device, a computer program product, a network node, a wireless communication device and arrangements for a network node and a wireless communication device, respectively, are also disclosed.

24 Claims, 7 Drawing Sheets

(51) Int. Cl.
*H04W 24/10* (2009.01)
*H04L 5/00* (2006.01)
*H04W 76/04* (2009.01)
*H04W 84/18* (2009.01)
*H04L 27/28* (2006.01)

(58) Field of Classification Search
USPC .................................. 370/252, 332
See application file for complete search history.

(56) References Cited

U.S. PATENT DOCUMENTS

| | | | |
|---|---|---|---|
| 2012/0020231 A1* | 1/2012 | Chen | H04W 36/08 370/252 |
| 2012/0307922 A1* | 12/2012 | Simonsson | H04W 24/10 375/260 |
| 2013/0077513 A1 | 3/2013 | Ng et al. | |
| 2013/0088988 A1* | 4/2013 | Deng | H04W 24/10 370/252 |
| 2013/0225188 A1 | 8/2013 | Seo et al. | |
| 2016/0174091 A1* | 6/2016 | Zhang | H04W 36/0094 370/252 |

OTHER PUBLICATIONS

PCT Written Opinion, dated Feb. 5, 2015, in connection with International Application No. PCT/EP2014/070106, all pages.

3GPP TS 36.214 V12.0.0 (Sep. 2014), 3rd Generation Partnership Project; Technical Specification Group Radio Access Network; Evolved Universal Terrestrial Radio Access (E-UTRA); Physical layer; Measurements (Release 12), 14 pages.

3GPP TS 36.214, V11.1.0 (Dec. 2012), Section 5.1.3, 3rd Generation Partnership Project; Technical Specification Group Radio Access Network; Evolved Universal Terrestrial Radio Access (E-UTRA); Physical layer; Measurements (Release 11), 14 pages.

3GPP TSG-RAN WG4 Meeting #68, R4-134475, Barcelona, Spain, Aug. 19-23, 2013, Agenda Item: 6.3, Way forward on RSRQ definition, 3 pages.

PCT Second Written Opinion, dated Aug. 28, 2015, in connection with International Application No. PCT/EP2014/070106, all pages.

PCT International Preliminary Report on Patentability, dated Jan. 21, 2016, in connection with International Application No. PCT/EP2014/070106, all pages.

* cited by examiner

CONFIGURATION OF MOBILITY MANAGEMENT MEASUREMENT METHOD

CROSS-REFERENCE TO RELATED APPLICATIONS

This application is a national stage application under 35 U.S.C. § 371 of PCT/EP2014/070106, filed Sep. 22, 2014, which claims the benefit of U.S. Provisional Application No. 61/884,488, filed Sep. 30, 2013, which applications are hereby incorporated herein by reference in their entireties.

TECHNICAL FIELD

The present invention relates generally to the field of wireless communication in relation to cellular communication systems. More particularly, it relates to mobility management measurements associated with wireless communication.

BACKGROUND

Even though closed formulations (e.g. must, shall, is, etc) may be used in the following disclosure, this is not to be interpreted as essential features or facts without alternatives. Contrarily, the disclosure is to be interpreted as a number of examples and embodiments provided for illustrative and non-limiting purposes.

In current 3GPP (Third Generation Partnership Project) discussions, there are two different RSRQ (Reference Signal Receiver Quality) measurement methods, which are expected to be specified in TS 36.214, Release 12 version 12.0.0 (compare with TS36.214, Release 11, sec. 5.1.3). The use of this is dependent on specific scenario. For the use of RSRQ in general the UE (User Equipment, a type of wireless communication device) is required to measure RSRQ only in specific symbols containing CRS (Cell-specific Reference Signal). This is very restricted for the UE and also for the network node.

Signal Quality Measurement

A signal quality measurement comprises of both signal strength and interference components. Typically it is the ratio of signal strength and interference in linear scale and difference between signal strength and interference in log scale.

In general the quality measurement ($Q_{rx}$) can be expressed as follows:

$$Q_{rx} = \frac{P_{rx}}{I + N_o} \quad (1)$$

Where, $P_{rx}$ is the received power of pilot or reference signal (i.e. signal strength part), $N_o$ is the noise power, and I is the interference. Depending upon the type of quality measurement the component I can be interference on the pilot or the total interference on the entire carrier or simply inter-cell interference plus noise.

The signal strength is typically measured on any kind of reference signal or pilot signal. The interference may include interference from one or several sources such as reference signals, control channels, data channels, noise etc. Examples of reference signals or pilot signals are primary synchronization signal (PSS), secondary synchronization signal (SSS), cell specific reference signal (CRS), reference signal (RS), channel state information reference signal (CSI-RS), positioning reference signal (PRS), demodulation reference signal (DM-RS), multimedia broadcast multicast service reference signal (MBMS RS), etc. Examples of signal quality are signal-to-noise ratio (SNR), signal-to-interference-and-noise ratio (SINR), reference signal received quality (RSRQ), common pilot channel energy per chip to noise power spectral density (CPICH Ec/No), channel state information (CSI), channel quality indication (CQI), channel state information reference signal received quality (CSI-RSRQ), etc.

The signal quality measurements (depending e.g. upon the measurement) may be performed on serving cell (or multiple serving cells in multi-carrier and/or coordinated multipoint (CoMP)) and one or more neighboring cells. The neighbor cells may belong to serving carrier frequency or non-serving carrier frequency. The non-serving carrier frequency can be inter-frequency or inter-RAT (radio access technology) carrier.

Furthermore the quality measurements (depending upon the measurement) may be performed by the UE in high activity RRC (radio resource control) state (e.g. RRC connected state, CELL_DCH state etc) and/or in low activity RRC states (e.g. idle state, CELL_PCH state, URA_PCH state, CELL_FACH state etc).

The RSRQ is typically used primarily for mobility in low (e.g. idle state, idle mode, URA_PCH state, CELL_PCH state etc) and high activity RRC states (e.g. connected state, CELL_FACH state, CELL_DCH state etc) in E-UTRAN and also in other systems for mobility with E-UTRAN.

In high activity state UE is known on cell level by the serving cell and can be typically scheduled by the serving cell.

Examples of other systems are UTRA FDD/TDD, GERAN/GSM, CDMA2000, HRPD, WLAN etc.

In low activity state the mobility scenario may comprise cell selection and cell reselection including intra-frequency, inter-frequency and inter-RAT (e.g. between UTRA to LTE (Long Term Evolution) etc). In high activity state example scenarios are cell change, handover, RRC connection re-establishment, RRC connection release with direction to target cell, primary component carrier (PCC) change in CA (carrier aggregation) or PCell (primary cell) change in CA etc.

Quality measurements including RSRQ may typically also be used for various applications other than mobility. Other example use cases are: positioning in general, enhanced cell ID (identity) positioning, fingerprinting positioning, minimization of drive tests (MDT), network planning, configuration and tuning of radio network parameters, self-organizing network (SON), network monitoring, interference management, determination and management of load, inter-cell interference control (ICIC) etc.

In low activity RRC state the UE may typically use quality measurement for autonomous actions e.g. cell reselection, logging results etc. In high activity RRC state the UE may typically report the measurements (e.g. in a mobility management measurement report) including RSRQ to the network node e.g. eNodeB, RNC (radio network controller), positioning node etc. The UE may, for example, report the quality measurement periodically, in an event triggered manner or on event triggered periodic manner.

RSRQ

Reference Signal Received Quality (RSRQ) is typically defined as the ratio N×RSRP/(E-UTRA carrier RSSI), where N is the number of resource blocks (RBs) of the E-UTRA carrier RSSI measurement bandwidth. The measurements in the numerator and denominator are preferably made over the same set of resource blocks.

Reference signal received power (RSRP) part of RSRQ is typically defined as the linear average over the power contributions (in [W]) of the resource elements that carry cell-specific reference signals within the considered measurement frequency bandwidth.

According to a typical application currently defined, RSSI measurements may be performed in two different variants.

According to the first variant (method), E-UTRA (LTE) Carrier Received Signal Strength Indicator (RSSI) in RSRQ comprises the linear average of the total received power (in [W]) observed only in OFDM (orthogonal frequency division multiplex) symbols containing reference symbols for antenna port 0, in the measurement bandwidth, over N number of resource blocks by the UE from all sources, including co-channel serving and non-serving cells, adjacent channel interference, thermal noise etc.

According to the second variant (method), if higher-layer signaling indicates certain subframes for performing RSRQ measurements, then RSSI is measured over all OFDM symbols in the indicated subframes. The higher layer signaling referred to herein may refer to the signaling of one or more measurement pattern to the UE for RSRQ measurements in heterogeneous network. The heterogeneous network typically comprises low and high power nodes. According to one example, the serving cell signals one or more measurement patterns (aka measurement resource restriction pattern) to inform the UE about the resources or subframes which the UE should use for performing measurements on a target victim cell (e.g. serving pico cell and/or neighboring pico cells). These resources or subframes within a measurement pattern where UE should measure RSRQ are protected from aggressor cell interference. These resources or subframes are also called restricted subframes or protected subframes.

These first and second variants (methods) will also be referred to below as respectively "old" and "new" mobility management measurement methods/RSRQ:s/methods/measurements/etc.

In various scenarios, mobility management measurements performed according to this approach may not be sufficiently accurate. Particularly, mobility management measurements performed according one or the other of the first and second methods may not be sufficiently accurate.

Therefore, there is a need for alternative approaches to mobility management measurements. Particularly, there is a need for approaches to selection between the first method and the second method in relation to various conditions.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The formulation that a network node is connectable to a wireless communication device (or vice versa) is meant to include the case where the wireless communication device is in an idle mode.

The formulation that an action takes place for each of one or more cells of a cellular communication network is meant to include the case where action takes place for only one (or some) of the cells of the cellular communication network, and not for other cells of the cellular communication network. For example, if the cellular communication network comprises some network nodes with the capability to perform the actions and other network nodes without the capability to perform the actions (e.g. legacy nodes).

It is an object of some embodiments to provide methods and arrangements for configuration of mobility management measurements.

Generally mobility management measurements may be seen as a form of signal quality measurements, mobility management measurement methods may be seen as a form of signal quality measurement methods, and mobility management measurement reports may be seen as a form of signal quality measurement reports.

It can be seen from the RSRQ definition that in the first RSRQ definition (i.e. RSRQ in general), the RSSI is determined only on OFDM signals including CRS:s from antenna port 0 while in the second RSRQ definition (used for heterogeneous network), the RSSI is determined based on all OFDM symbols in a sub frame. Hence, the first and second measurement method determines substantially the same measurement quantity (cell load) however, uses different received signals. In heterogeneous network due to low interference in subframes in measurement pattern in which UE has to do the RSRQ measurement, the first RSRQ definition will lead to over estimation of RSRQ quality. Due to this reason in heterogeneous network the RSSI part is measured in all OFDM symbols in the restricted subframe.

According to some embodiments, UE/devices may be allowed to use the old or new RSRQ definition in order to simplify the UE implementation, network (NW) reporting and RRM (radio resource management). This situation will be used as an example throughout this disclosure, but according to other embodiments, the old and new RSRQ measurement methods may be substituted with any two or more mobility management measurement methods (e.g. RSRQ measurement methods).

Employing two or more different RSRQ measurement methods may lead to different performance (e.g. due to different RSRQ measurement accuracy) depending on the cell load of serving as well as neighboring cells. As long as the cells are time aligned and synchronized (i.e. the system frame numbers (SFN) and OFDM symbols in each sub frame is aligned up to an uncertainty in the order of the cyclic prefix (approx. 4.7 micro seconds) and the cell load is moderate or high, there are very small differences (0.5 dB) between the two measurement methods. However, in case of low load and synchronous cells there is a difference that ends up in a bias of the new measurement compared to the old measurement approach. Furthermore in asynchronous systems, where the neighboring cell timing are different and cells have low load there is a discrepancy between the measurements. This is especially true for low carrier to interference ratio, e.g. C/I<0.

FIGS. 1-4 are simulation plots illustrating the cumulative distribution function (CDF) of the difference (in dB) between the new RSRQ measurement method and the old RSRQ measurement method (RSRQ Rel 11) at various C/I (−9, −6, −3, 0, 3, 6, 9, 12 and 15 dB) for heavily (P(PDSCH)=100%) and lightly (P(PDSCH)=25%) loaded cells (thus, experienced cell load at a wireless communication device) in synchronized (sync, FIGS. 1 and 2) and asynchronized (async, FIGS. 3 and 4) networks (thus, different time synchronization metric values).

The discrepancy between the measurements in certain scenarios may give rise to one or several problems in the prior art Radio resource Management (RRM) of the devices in a cell, for instance:

Each of the methods may have different benefits (pros) and drawbacks (cons). For some load conditions between the cells, one of the methods might give a more true value than the other. However, a typical device does not know which method to use and when to use it, and hence may end up using a non-optimal RSRQ measure giving capacity degradation in the system when the NW node is not provided with (and/or does not use the best RSRQ measure.

The network node may not know which method a device is using for determining the RSRQ in an approach where devices are allowed to use any of the methods regardless of radio scenario. Again non-optimized handover (HO) decision may be made by the RRM in the NW node.

A typical method does not utilize the actual difference in RSRQ results depending on RSRQ measurement method and hence cannot utilize this in the cellular NW deployment.

According to some embodiments, the above mentioned short comings of the different RSRQ measurement methods are taken into account and a choice of (preferably the best) measurement method is made based on current radio scenario.

Some embodiments concern areas such as RRM, Signal Measurements, RSRQ, LTE, Mobility, and/or Load.

The embodiments are applicable to any signal quality measured by the UE on signals from one or more cells. However for simplicity the embodiments are described for RSRQ measurement.

Some embodiments use an approach to RSRQ measurements where the use of different RSRQ definitions in a wide range of scenarios is exploited to ensure overall benefit especially in mobility performance.

Several aspects, embodiments and examples are disclosed herein. At least some embodiments are:

A method of a UE of performing a signal quality measurement, the method comprises:

obtaining information whether to perform the signal quality measurement based on first or second measurement methods, wherein the first measurement method using a subset of the received signal used in the second measurement method;

selecting first or second measurement method based on obtained information; and performing the signal quality measurement using the selected method.

A method of a NW node serving a UE of configuring the UE to perform a signal quality measurement, the method comprises:

determining whether the UE should perform the signal quality measurement based on first or measurement methods, wherein the first measurement method using a subset of the received signal used in the second measurement method; and configuring the UE to perform the signal quality measurement based on the determined method.

The following describes some example aspect and embodiments.

A first aspect is a method of a wireless communication device connectable to a cellular communication network. The method comprises (for each of one or more cells of the cellular communication network) acquiring at least one of an experienced cell load of the cell and a time synchronization metric indicative of a time synchronization between the cell and one or more other cells of the cellular communication network, selecting a mobility management measurement method based on at least one of the experienced cell load and the time synchronization metric, and performing mobility management measurements according to the selected method.

The method may be suitable for mobility management measurements.

The one or more cells may be one or more detected cells, for example, a serving/camping cell and/or one or more neighboring cells.

Acquiring the experienced load and/or the time synchronization metric may be performed according to any suitable known or future method. For example, the experienced load and/or the time synchronization metric (or an indication thereof) may be received from a network node. Alternatively or additionally, the experienced load and/or the time synchronization metric may be determined based on measurements and/or calculations.

The mobility management measurement method may be selected from a group of available mobility management measurement methods. The group of available mobility management measurement methods may comprise a first method wherein measurements are made based on a first number of symbols and a second method wherein measurements are made based on a second number of symbols. The second number of symbols may be larger than the first number of symbols (or vice versa). The first number of symbols may be a subset of the second number of symbols (or vice versa).

The mobility management measurement method may comprise radio resource management (RRM) and/or radio resource control (RRC) measurements. For example, the mobility management measurement method may comprise a method to measure and/or calculate a received signal strength indication (RSSI) value and/or a reference signal received quality (RSRQ) value.

In some embodiments, the method may further comprise transmitting a mobility management measurement report to a network node of the cellular communication network comprising an indication of a result of the performed mobility management measurements.

The mobility management measurement report may be indicative of the selected mobility management measurement method, according to some embodiments.

In some embodiments, the method may further comprise performing a cell reselection procedure based on the performed mobility management measurements.

In some embodiments, the method may further comprise receiving a measurement configuration message from a network node of the cellular communication network, and selecting a mobility management measurement method may be further based on the measurement configuration message.

The measurement configuration message and/or the mobility management measurement report may be comprised in a RRC configuration message.

The mobility management measurement report may comprise one or more bits adapted to carry information indicative of the selected mobility management measurement method.

The measurement configuration message may comprise one or more of:
an indication regarding the cell load;
an indication regarding the time synchronization;

an indication of a group of available mobility management measurement methods (the group may comprise one or more available methods);

a request to receive an indication of the selected mobility management measurement method in the mobility management measurement report; and a request for mobility management measurements to be performed and reported according to more than one selected mobility management measurement method.

When the configuration explicitly instructs the wireless communication device that it should use one particular mobility management measurement method (the group comprises only one available method), the steps of acquiring and/or selecting may be skipped according to some embodiments. The steps of acquiring and/or selecting may also be skipped according to some embodiments when the reports are to be used for statistical purposes according to some embodiments (see e.g. FIG. 10).

Thus, in some embodiments, the method may comprise (for each of one or more cells of the cellular communication network) receiving a measurement configuration message from a network node of the cellular communication network, wherein the measurement configuration message comprises an instruction that the wireless communication device should use a particular mobility management measurement method, the particular mobility management measurement method selected from a group of available mobility management measurement methods comprising a first mobility management measurement method wherein measurements are made based on a first number of symbols and a second mobility management measurement method wherein measurements are made based on a second number of symbols, and performing mobility management measurements according to the particular mobility management measurement method.

In some embodiments, the method may further comprise transmitting a mobility management measurement report to the network node of the cellular communication network comprising an indication of a result of the performed mobility management measurements.

The first number of symbols may be a subset of the second number of symbols.

The second number of symbols may comprise all orthogonal frequency division multiplex (OFDM) symbols in a subframe of the received signal and the first number of symbols may comprise only orthogonal frequency division multiplex (OFDM) symbols in a subframe of the received signal that carry cell-specific reference signals (CRS).

The mobility management measurement methods may comprise methods to measure a received signal strength indication (RSSI) and calculate a reference signal received quality (RSRQ) value based on the measured received signal strength indication.

In some embodiments, the method may further comprise performing the particular mobility management measurement method in one or more of the following states: Radio Resource Control—RRC—idle state, Radio Resource Control—RRC—connected state, Idle mode, Universal terrestrial radio access network Registration Area Paging Channel (URA_PCH) state, Cell Paging Channel (CELL_PCH) state, Forward Access Channel (CELL_FACH) state, and Dedicated Channel (CELL_DCH) state.

In some embodiments, the method may further comprise transmitting a capability indication message to the network node of the cellular communication network, wherein the capability indication message is indicative of a collection of mobility management measurement methods supported by the wireless communication device. The collection may comprise the first and second mobility management measurement methods.

According to some embodiments, a method is provided of a wireless communication device connectable to a cellular communication network.

The method may comprise (for each of one or more cells of the cellular communication network) selecting a signal quality measurement method from a group of available signal quality measurement methods comprising a first signal quality measurement method wherein measurements are made based on a first number of symbols and a second signal quality measurement method wherein measurements are made based on a second number of symbols, and performing signal quality measurements according to the selected method.

A second aspect is a method of a network node of a cellular communication network connectable to one or more wireless communication devices.

The method comprises (for each of one or more cells of the cellular communication network) acquiring at least one of an experienced cell load of the cell and a time synchronization metric indicative of a time synchronization between the cell and one or more other cells of the cellular communication network, receiving one or more mobility management measurement reports from respective wireless communication devices, wherein each mobility management measurement report comprises an indication of a result of mobility management measurements performed by the respective wireless communication device, and compensating at least one of the result indications based on at least one of the experienced cell load and the time synchronization metric.

The method may be suitable for mobility management.

In some embodiments, the method may further comprise using the compensated result indication in a mobility management procedure.

In some embodiments, the method may further comprise using the compensated result indication for statistical purposes.

The one or more cells may, for example, be a cell served by the network node and/or one or more neighboring cells.

Acquiring the experienced load and/or the time synchronization metric may be performed according to any suitable known or future method. For example, the experienced load and/or the time synchronization metric (or an indication thereof) may be received from other network nodes of the cellular communication network and/or from one or more wireless communication devices. Alternatively or additionally, the experienced load and/or the time synchronization metric may be determined based on measurements and/or calculations.

The mobility management measurements may comprise radio resource management (RRM) and/or radio resource control (RRC) measurements. For example, the mobility management measurements may comprise a received signal strength indication (RSSI) value and/or a reference signal received quality (RSRQ) value.

Compensating a result indication (e.g. a mobility management measurement value) may comprise scaling and/or biasing the result indication.

For example, the result indication may be biased in relation to an experienced load. If, for example, an experienced load is lower than a load threshold, a bias value may be added (or subtracted) from the result indication. In some embodiments, several threshold and corresponding bias values may be applied.

Alternatively or additionally, the result indication may be scaled in relation to a time synchronization metric. For example, measurements of an asynchronous situation and affected by high interference may be given a lower weight.

The mobility management measurement report may be indicative of a mobility management measurement method selected by the respective wireless communication device according to some embodiments.

Compensating the result indication may be further based on the selected mobility management measurement method. For example, result indication based on a selected first method may be left unchanged while a result indication based on a selected second method may be compensated.

In some embodiments, the method may further comprise transmitting a respective measurement configuration message to at least one of the respective wireless communication devices.

The respective measurement configuration message(s) may be transmitted prior to receiving the one or more mobility management measurement reports.

The measurement configuration message and/or the mobility management measurement report may be comprised in a RRC configuration message.

The measurement configuration message may comprise one or more of:
  an indication regarding the cell load;
  an indication regarding the time synchronization;
  an indication of a group of available mobility management measurement methods (the group may comprise one or more available methods);
  a request to receive an indication of the selected mobility management measurement method in the mobility management measurement report; and
  a request for mobility management measurements to be performed and reported according to more than one selected mobility management measurement method.

When the configuration explicitly instructs the wireless communication device that it should use one particular mobility management measurement method (the group comprises only one available method), the step of compensating may be skipped according to some embodiments (see e.g. FIG. 8). The step of compensating may also be skipped according to some embodiments when the reports are to be used for statistical purposes according to some embodiments (see e.g. FIG. 9). In the latter case, the acquiring step may also be skipped according to some embodiments.

Thus, in some embodiments, the method may comprise (for each of one or more cells of the cellular communication network) transmitting a respective measurement configuration message to at least one of the wireless communication devices, wherein each measurement configuration message comprises an instruction that the wireless communication device should use a particular mobility management measurement method, the particular mobility management measurement method being selected from a group of available mobility management measurement methods comprising a first mobility management measurement method wherein measurements are made based on a first number of symbols and a second mobility management measurement method wherein measurements are made based on a second number of symbols, and receiving one or more mobility management measurement reports from respective ones of the wireless communication devices, wherein each mobility management measurement report comprises an indication of a result of mobility management measurements performed by the respective wireless communication device.

The first number of symbols may be a subset of the second number of symbols.

The second number of symbols may comprise all orthogonal frequency division multiplex (OFDM) symbols in a subframe of the received signal and the first number of symbols may comprise only orthogonal frequency division multiplex (OFDM) symbols in a subframe of the received signal that carry cell-specific reference signals (CRS).

In some embodiments, the method may further comprise acquiring at least one of an experienced cell load of the cell and a time synchronization metric indicative of a time synchronization between the cell and one or more other cells of the cellular communication network. The particular mobility management measurement method may be selected based on one or more of the experienced cell load and the time synchronization metric.

The mobility management measurement methods may comprise methods to measure a received signal strength indication (RSSI) and calculate a reference signal received quality (RSRQ) value based on the measured received signal strength indication.

In some embodiments, the particular mobility management measurement method is to be performed by the respective wireless communication device in one or more of the following states: Radio Resource Control—RRC—idle state, Radio Resource Control—RRC—connected state, Idle mode, Universal terrestrial radio access network Registration Area Paging Channel (URA_PCH) state, Cell Paging Channel (CELL_PCH) state, Forward Access Channel (CELL_FACH) state, and Dedicated Channel (CELL_DCH) state.

The method may further comprise using the result of mobility management measurements in a mobility management procedure.

According to some embodiments, the method may further comprise receiving a capability indication message from at least one of the respective wireless communication devices, wherein the capability indication message is indicative of a collection of mobility management measurement methods supported by the respective wireless communication device.

The capability indication message may typically be received prior to receiving the one or more mobility management measurement reports and possible transmission of respective measurement configuration message(s) may be performed in response to receiving the capability indication message. The respective measurement configuration message(s) may be based on the capability indication message.

A third aspect is a computer program product comprising a computer readable medium, having thereon a computer program comprising program instructions. The computer program is loadable into a data-processing unit and adapted to cause the data-processing unit to execute method steps according to any of the first and second aspects when the computer program is run by the data-processing unit.

A fourth aspect is an arrangement of a wireless communication device connectable to a cellular communication network.

The arrangement comprises a selector, a mobility management measurement unit and at least one of a cell load acquiring unit and a time synchronization metric acquiring unit, wherein (for each of one or more cells of the cellular communication network) the cell load acquiring unit is adapted to acquiring an experienced cell load of the cell, the time synchronization metric acquiring unit is adapted to acquire a time synchronization metric indicative of a time synchronization between the cell and one or more other cells of the cellular communication network, the selector is adapted to select a mobility management measurement method based on at least one of the experienced cell load and the time synchronization metric, and the mobility management measurement unit is adapted to perform mobility management measurements according to the selected method.

The arrangement may be suitable for mobility management measurements.

The one or more cells may be one or more detected cells, for example, a serving/camping cell and/or one or more neighboring cells.

Acquiring the experienced load and/or the time synchronization metric may be performed according to any suitable known or future method. For example, the arrangement may comprise a receiver adapted to receive the experienced load and/or the time synchronization metric (or an indication thereof) from a network node. Alternatively or additionally, the experienced load and/or the time synchronization metric may be determined based on measurements and/or calculations.

The selector may be adapted to select the mobility management measurement method from a group of available mobility management measurement methods. The group of available mobility management measurement methods may comprise a first method wherein measurements are made based on a first number of symbols and a second method wherein measurements are made based on a second number of symbols. The first number of symbols may be larger than the second number of symbols. The second number of symbols may be a subset of the first number of symbols.

The mobility management measurement method may comprise radio resource management (RRM) and/or radio resource control (RRC) measurements. For example, the mobility management measurement method may comprise a method to measure and/or calculate a received signal strength indication (RSSI) value and/or a reference signal received quality (RSRQ) value.

In some embodiments, the arrangement may further comprise a transmitter adapted to transmit a mobility management measurement report to a network node of the cellular communication network comprising an indication of a result of the performed mobility management measurements.

The mobility management measurement report may be indicative of the selected mobility management measurement method.

In some embodiments, the arrangement may further comprise a cell selection unit adapted to perform a cell reselection procedure based on the mobility management measurements.

In some embodiments, the arrangement may further comprise a receiver adapted to receive a measurement configuration message from a network node of the cellular communication network, and the selector may be adapted to select the mobility management measurement method further based on the measurement configuration message.

The measurement configuration message and/or the mobility management measurement report may be comprised in a RRC configuration message.

The mobility management measurement report may comprise one or more bits adapted to carry information indicative of the selected mobility management measurement method.

The measurement configuration message may comprise one or more of:
  an indication regarding the cell load;
  an indication regarding the time synchronization;
  an indication of a group of available mobility management measurement methods (the group may comprise one or more available methods);
  a request to receive an indication of the selected mobility management measurement method in the mobility management measurement report; and
  a request for mobility management measurements to be performed and reported according to more than one selected mobility management measurement method.

In some embodiments, the arrangement may further comprise a transmitter adapted to transmit a capability indication message to a network node of the cellular communication network, and the capability indication message may be indicative of a collection of mobility management measurement methods supported by the wireless communication device.

In some embodiments, the selector may be excluded from the arrangement (compare with corresponding embodiments of the first aspect).

Thus, in some embodiments, the arrangement comprises a mobility management measurement unit and a receiver, wherein (for each of one or more cells of the cellular communication network) the receiver is adapted to receive a measurement configuration message from a network node of the cellular communication network, wherein the measurement configuration message comprises an instruction that the wireless communication device should use a particular mobility management measurement method, the particular mobility management measurement method selected from a group of available mobility management measurement methods comprising a first mobility management measurement method wherein measurements are made based on a first number of symbols and a second mobility management measurement method wherein measurements are made based on a second number of symbols, and the mobility management measurement unit is adapted to perform mobility management measurements according to the particular mobility management measurement method.

In some embodiments, the arrangement may further comprise a transmitter adapted to transmit a mobility management measurement report to the network node of the cellular communication network comprising an indication of a result of the performed mobility management measurements.

A fifth aspect is a network node for a cellular communication network comprising the arrangement of the fourth aspect.

A sixth aspect is a mobility management arrangement of a network node of a cellular communication network connectable to one or more wireless communication devices.

The arrangement comprises a receiver, a compensator and at least one of a cell load acquiring unit and a time synchronization metric acquiring unit, wherein (for each of one or more cells of the cellular communication network) the cell load acquiring unit is adapted to acquiring an experienced cell load of the cell, the time synchronization metric acquiring unit is adapted to acquire a time synchronization metric indicative of a time synchronization between the cell and one or more other cells of the cellular communication network, the receiver is adapted to receive one or more mobility management measurement reports from respective wireless communication devices, wherein each mobility management measurement report comprises an indication of a result of mobility management measurements performed by the respective wireless communication device, and the compensator is adapted to compensate at least one of the result indications based on at least one of the experienced cell load and the time synchronization metric.

The arrangement may be suitable for mobility management.

In some embodiments, the arrangement may further comprise a mobility management unit adapted to use the compensated result indication in a mobility management procedure.

In some embodiments, the arrangement may further comprise a statistical unit adapted to use the compensated result indication for statistical purposes.

The one or more cells may, for example, be a cell served by the network node and/or one or more neighboring cells.

Acquiring the experienced load and/or the time synchronization metric may be performed according to any suitable known or future method. For example, the arrangement may comprise a receiver adapted to receive the experienced load and/or the time synchronization metric (or an indication thereof) from other network nodes of the cellular communication network and/or from one or more wireless communication devices. Alternatively or additionally, the experienced load and/or the time synchronization metric may be determined based on measurements and/or calculations.

The mobility management measurements may comprise radio resource management (RRM) and/or radio resource control (RRC) measurements. For example, the mobility management measurements may comprise a received signal strength indication (RSSI) value and/or a reference signal received quality (RSRQ) value.

Compensating a result indication (e.g. a mobility management measurement value) may comprise scaling and/or biasing the result indication.

For example, the result indication may be biased in relation to an experienced load. If, for example, an experienced load is lower than a load threshold, a bias value may be added (or subtracted) from the result indication. In some embodiments, several threshold and corresponding bias values may be applied.

Alternatively or additionally, the result indication may be scaled in relation to a time synchronization metric. For example, measurements of an asynchronous situation and affected by high interference may be given a lower weight.

The mobility management measurement report may be indicative of a mobility management measurement method selected by the respective wireless communication device.

Compensating the result indication may be further based on the selected mobility management measurement method. For example, result indication based on a selected first method may be left unchanged while a result indication based on a selected second method may be compensated.

In some embodiments, the arrangement may further comprise a transmitter adapted to transmit a respective measurement configuration message to at least one of the respective wireless communication devices.

The respective measurement configuration message(s) may be transmitted prior to receiving the one or more mobility management measurement reports.

The measurement configuration message and/or the mobility management measurement report may be comprised in a RRC configuration message.

The measurement configuration message may comprise one or more of:
  an indication regarding the cell load;
  an indication regarding the time synchronization;
  an indication of a group of available mobility management measurement methods (the group may comprise one or more available methods);
  a request to receive an indication of the selected mobility management measurement method in the mobility management measurement report; and
  a request for mobility management measurements to be performed and reported according to more than one selected mobility management measurement method.

In some embodiments, the compensator may be excluded from the arrangement (compare with corresponding embodiments of the second aspect).

Thus, in some embodiments, the arrangement comprises a receiver and a transmitter, wherein (for each of one or more cells of the cellular communication network) the transmitter is adapted to transmit a respective measurement configuration message to at least one of the wireless communication devices, wherein each measurement configuration message comprises an instruction that the wireless communication device should use a particular mobility management measurement method, the particular mobility management measurement method being selected from a group of available mobility management measurement methods comprising a first mobility management measurement method wherein measurements are made based on a first number of symbols and a second mobility management measurement method wherein measurements are made based on a second number of symbols, and the receiver is adapted to receive one or more mobility management measurement reports from respective ones of the wireless communication devices, wherein each mobility management measurement report comprises an indication of a result of mobility management measurements performed by the respective wireless communication device.

In some embodiments, the arrangement may further comprise a receiver adapted to receive a capability indication message from at least one of the respective wireless communication devices, wherein the capability indication message may be indicative of a collection of mobility management measurement methods supported by the respective wireless communication device.

The capability indication message may typically be received prior to receiving the one or more mobility management measurement reports and possible transmission of respective measurement configuration message(s) may be performed in response to receiving the capability indication message. The respective measurement configuration message(s) may be based on the capability indication message.

A seventh aspect is a network node for a cellular communication network comprising the arrangement of the sixth aspect.

In some embodiments, the various methods, arrangements and devices exemplified above according to the various aspects and embodiments may additionally have features identical with or corresponding to any of the various features as explained for other of the various methods, arrangements and devices according to the various aspects and embodiments. For example, an arrangement may have features identical with or corresponding to any of the various features as explained for a corresponding method, and vice versa.

In the examples above, a cellular communication network has been used for illustrative purposes. Generally, embodiments may be equally applicable in any suitable wireless communication system, for example, a wireless local area network (WLAN) system.

Correspondingly, the wireless communication device and the network node used in the examples above for illustrative purposes may, according to some embodiments, be substituted by any suitable wireless communication nodes.

In embodiments, where the wireless communication system is not a cellular communication system, "cell" as used in the examples above may be substituted by another suitable concept, for example, a coverage area of a wireless communication node (e.g. a WLAN access point).

In some embodiments other parameters than the experienced cell load and/or the time synchronization metric may be applied in a similar manner. For example, a signal quality metric (e.g. C/I, SNR, SINR, Es/Iot (symbol energy to interference over thermal noise), etc.) may be used instead of (or in addition to) the cell load in the examples above.

An advantage of some embodiments is that an approach to select between the first and second mobility management measurement methods is provided. Another advantage of some embodiments is that an approach to configuring wireless communication devices for mobility management measurements is provided.

Yet another advantage of some embodiments is that mobility management measurements may be adapted by selection between the first and second mobility management measurement method based on the cell load and/or the interference conditions.

Yet another advantage of some embodiments is that mobility management measurements may be adapted by selection between the first and second mobility management measurement method based on the deployment scenario and/or based on the power class of base stations for which the measurements are to be performed.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
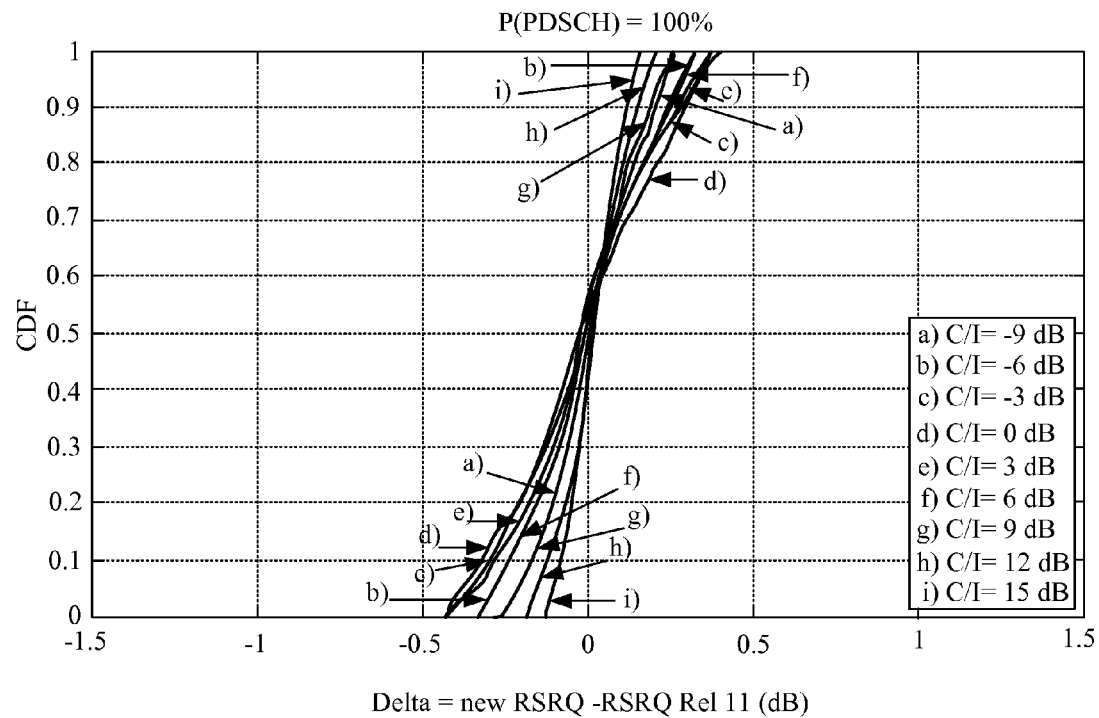
FIGS. 1-4 are simulation plots illustrating differences in the result using the first and second mobility management measurement method.

In the following, embodiments will be described where a mobility management measurement method is selected (e.g. a choice of signal quality measurement method may be provided). In some embodiments, one or more wireless communication devices are configured by a network node to apply the selected mobility management measurement method.

In the description below we may use the term UE or device or wireless device. However it may also be a sensor, modem, target device, device to device UE, machine type UE or UE capable of machine to machine communication, a sensor equipped with UE PDA (personal digital equipment), iPAD, Tablet, mobile terminals, smart phone, laptop embedded equipped (LEE), laptop mounted equipment (LME), USB dongles, Customer Premises Equipment (CPE) etc.

Also in the embodiments a general terminology, "radio network node" or simply "network node (NW node)", is used and it refers to any kind of network node which may comprise of base station, radio base station, base transceiver station, base station controller, network controller, evolved Node B (eNB), Node B, relay node, positioning node, E-SMLC (evolved serving mobile location center), location server, repeater, access point, radio access point, Remote Radio Unit (RRU) Remote Radio Head (RRH), multi-standard radio (MSR) radio node such as MSR BS (multi-standard radio base station) nodes in distributed antenna system (DAS), SON node, O&M (operations and maintenance), OSS (operation system support), MDT (minimization of drive test) node, Core network node, MME (mobility management entity), etc.

Furthermore, below is exemplified with an LTE system and signal measurement method may be RSRQ, however the invention may not be limited to that case but also apply to other kinds of quality measurements and/or cellular communication systems.

Hence, some embodiments refer to a first and second (mobility management) measurement method measuring substantially the same measurement quantity, but using different received signals for obtaining the first and second signal measurement (or the first measurement method using a subset of the received signal used in the second measurement method) and method and apparatus for a control unit controlling which of first or second measurement method to be used for measuring the measurement quantity for a certain cell. Some embodiments also refer to a first and second measurement method measuring substantially the same measurement quantity, but using different received signals for obtaining a part of the first and second signal measurement (or the first measurement method using a subset of the received signal used in the second measurement method) and method and apparatus for a control unit controlling which of first or second measurement method to be used for measuring the measurement quantity for a certain cell. The part herein can be the numerator or denominator in the measurement quality. For example it may be only the RSSI part of the RSRQ, whereas RSRP is measured over the same reference signals in both first and second measurement methods. As an example in the first measurement method UE uses only CRS symbols (i.e. OFDM symbols containing CRS) for measuring RSSI for RSRQ whereas in the second measurement method the UE uses all symbols in a subframe for measuring RSSI for RSRQ. In yet another example in the first measurement method UE uses only CRS symbols (i.e. OFDM symbols containing CRS) for measuring RSSI for RSRQ whereas in the second measurement method the UE uses any set of symbols (i.e. can be less than all available symbols) in a subframe for measuring RSSI for RSRQ. The control unit may be in either the device or in the NW node, or parts of the control unit may be in device and other parts in the NW node.

The invention covers several embodiments, and a number of example groups of embodiments (each group denoted as A, B, C, D, E, F respectively) will be described in detail below.

UE Based Decision for Switch of RSRQ Measurement Method (A)

This is purely UE based implementation embodiment for switching between first and second types of RSRQ measurement method. In this embodiment it is assumed that the UE is allowed to use old and new RSRQ (i.e. first and second measurement methods) and switch between methods based on internal measurements. It may therefore be pre-defined (e.g. specified in the standard) that the UE is allowed to use first or second measurement method for RSRQ measurements. Both first and second methods will also be pre-defined. Then the UE switches between using the old and new RSRQ definitions based on one or more criteria related to the radio characteristics. Examples of criteria are at least one of (experienced) cell load, synchronization status of cells in network (time synchronization metric) as it knows from the cell timing determined from the cells search. Yet another criterion could be the radio environment where the UE is operating e.g. AWGN (additive white Gaussian noise), user speed, delay spread of the radio channel, rural environment, high speed etc. The UE may also contain stored information about the cell timing e.g. based on historical date or cell search carried out in the past. The UE may also obtain information about the synchronization status of the cells from the network node. The synchronization status of certain cells or parts of network may also be pre-defined e.g. it may be pre-defined that cells used in CoMP or in multi-carrier or carrier aggregation operation are synchronized. The cell timing herein refers to the transmit timing of a signal transmitted by the cell as observed or obtained by the UE. Based on the cell timing, the device may determine whether cells are time aligned and synchronized or not. The time aligned and synchronized cells mean that their frame transmit timing are within certain accuracy e.g. within +/−3 µs (or within the cyclic prefix). In one example embodiment, in case cells are synchronized the new RSRQ definition may be used. In case of asynchronous cells detected, the old RSRQ may be used. In yet another embodiment also estimated cell load may be used. Cell load may be determined by the RSRQ measurement itself and/or other measurements like CQI, indicating high (say >65% of PDSCH—physical downlink shared channel) RBs allocated, medium (30-65%) or low load (<.30%). The UE may also determine cell load by reading the scheduling information sent on downlink (DL) control channel e.g. PDCCH (physical downlink control channel) in serving and neighboring cells. The UE when operating in CoMP scenario can read control channels of plurality of nodes or cells. Hence, in case of asynchronous but high load in most of the cells (or at least in the serving cell), new RSRQ measurement method is used, while in case of low or medium load in at least one cell (may be serving or neighboring cell) the old RSRQ measurement is used. The RSRQ measurement method may be chosen independently for each detected cell, or may be the same for all detected cells. Furthermore, the RSRQ method may be different for different carrier frequencies as well.

In some embodiments, the UE may be restricted with regard to switching between different RSRQ measurement methods. For example, it may not be allowed to switch before a certain time period has elapsed e.g. not more often than L1 measurement period, such as 200 ms. The UE may also be restricted to not switch between different RSRQ measurement methods before completing the L1 filtering (and/or L3 filtering of the ongoing measurement). The UE may also be restricted to not switch between different RSRQ measurement methods before completing the evaluation of the ongoing event or event reporting. When measuring relative RSRQ, which is used to compare RSRQ from different cells such as serving and neighbor cells' RSRQ, the UE may decide to use only one of the methods e.g. first method or second method.

Figure 5:
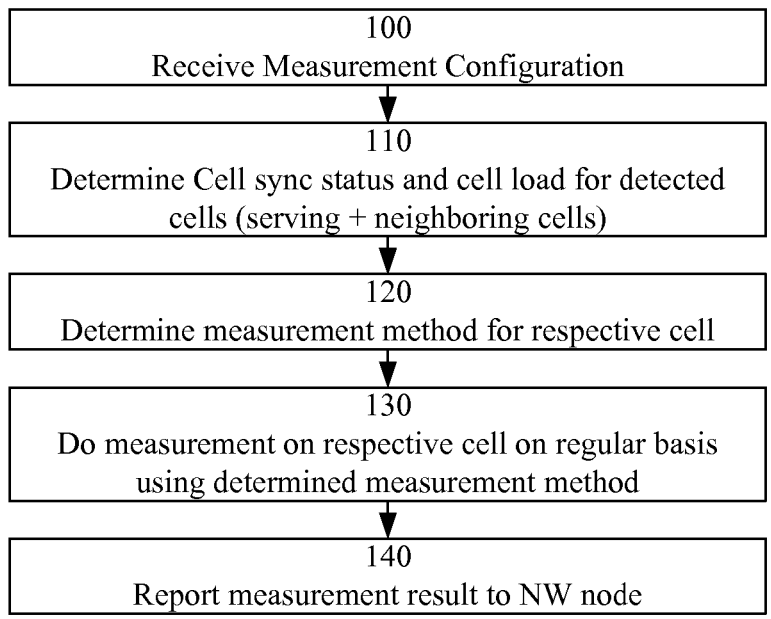
FIGS. 5-10 are flowcharts illustrating example method steps according to some embodiments.

FIG. 5 shows a flow chart over the device embodiment A.

(100) The device receives measurement configuration from the NW node. The configuration may include which quantity to measure (e.g. RSRQ) together with frequency layers and filter constants to use to determine the final measurement result.

(110) The device determines the cell synchronization status (time synchronization metric) and/or the cell load status (experienced cell load) according to described above.

(120) Based on determined information in (110) the device determines (mobility management) measurement method used for the configured measurement quantity.

(130) Measurement is made according to configured information.

(140) Measurement results are reported (e.g. mobility management measurement report) to NW node either on event basis or on regular basis.

UE Based Decision for Switch of Measurement Method Including Signaling to NW node (B)

This embodiment is an extension of the above mentioned method. In this case the UE autonomously selects first or second type of RSRQ but in the measurement report it indicates which definition was used or any information pertaining to the measurement method used for RSRQ measurement (e.g. 0=old i.e. first method and 1=new i.e. second method). In some embodiments, same RSRQ measurement for all detected cells are used, only 0 or 1 is transmitted, however in embodiments where different cell RSRQ are estimated using different methods, there is a "1" or "0" transmitted for respective cell in the measurement report. If different methods are used for relative RSRQ from different cells (e.g. serving and neighbor cells) then UE indicates which method is used for each of the two RSRQ in the measurement report.

According to another aspect of this embodiment the NW node may also configure the UE that whether the UE should include the information about the measurement method used for measuring RSRQ or not.

Figure 6:
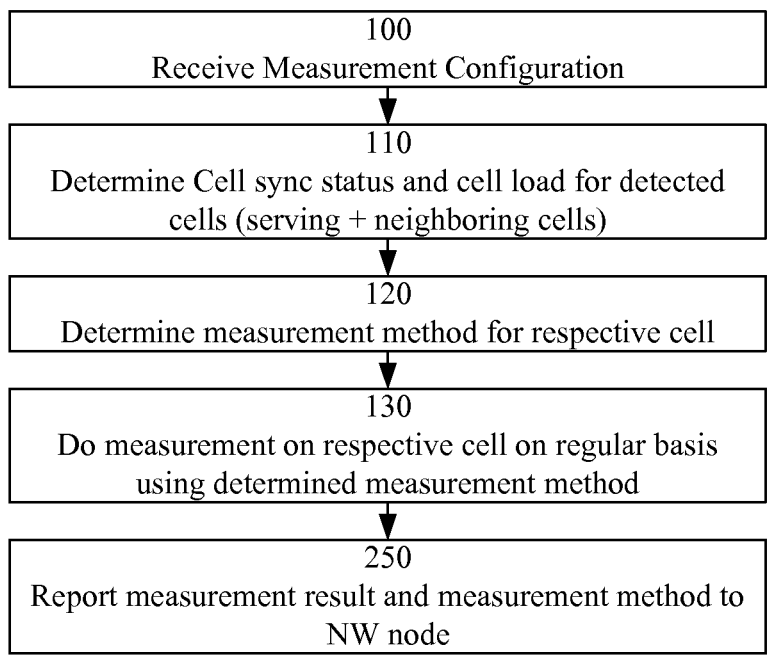

FIG. 6 shows a flow chart over device embodiment B. The first four steps of FIG. 6 are the same as (or very similar to) the steps described in connection with FIG. 5 and are therefore denoted with the same reference numbers.

(100) The device receives measurement configuration (measurement configuration message) from the NW node. The configuration may include which quantity to measure (e.g. RSRQ) together with frequency layers and filter constants to use to determine the final measurement result.

(110) The device determines the cell synchronization status and/or the cell load status according to described above.

(120) Based on determined information in (110) the device determine measurement method used for the configured measurement quantity.

(130) Measurement is made according to configured information.

(250) Measurement method and measurement results for respective cells in the measurement set are reported to NW node either on event basis or on regular basis.

NW node (C)

This is a group of embodiments that may, for example, be a corresponding NW node embodiment to the device embodiment (B). The NW node typically receives measurement reports from the device either on regular basis (every 500-1000 ms, say) or on event basis or on event triggered periodic manner (when a device triggers a handover event according to well-known prior art principles). In the measurement report, not only the RSRQ measurement on respective cell in the measurement set is transmitted according to some embodiments but also which RSRQ method that has been used for respective cell. The NW node then takes this information into account and may apply compensation (e.g. adding/subtracting a constant/bias or scaling the result) to at least some of the received measurements in order to determine an adjusted RSRQ measurement that is used in the further RRM (e.g. for HO decisions etc.). The compensation may be done based on NW node knowledge of radio characteristics which for example may comprise of one or more of cell synchronization status (asynched/synched NW, time synchronization metric) or (experienced) cell load in serving cell and/or neighboring cells. In one example embodiment the NW node does the determination autonomously, while in another embodiment the NW node communicates with other NW nodes over (for instance) the X2 interface in order to determine whether compensation of RSRQ measurements are needed or not. For example the NW acquires cell load information about neighboring cells by means of measurements received from other nodes. Examples of measurements are base station mean or maximum transmit power, overload indicator, network load indicator, mean or maximum cell transmission rate (e.g. bit rate, throughput etc), mean or maximum transmit power of data channels (e.g. PDSCH), control channels (e.g. PDCCH etc) etc. The network node may also determine the sync level of cells based on UE measurements like reference signal time difference (RSTD) measurement defined in the LTE standard. The RSTD is measured by the UE on reference signals received from two cells: reference cell and neighbor cells.

Again, the compensation may be made on a subset of all RSRQ measurements (e.g. a subset of cells). The amount of compensation to be applied can be based on a pre-defined or lookup table which maps cell load (e.g. $x^{th}$ percentage of total load), synchronization status of the cells/network (e.g. sync or async) and the amount of compensation (e.g. y dB). The lookup table may also be obtained under different radio environment which may comprise of one or more of UE speed, multipath delay profile, delay spread etc. The compensation may vary between −10 to +10 dB depending upon the scenario. These lookup tables can be obtained based on field tests, survey or historical data.

Figure 7:
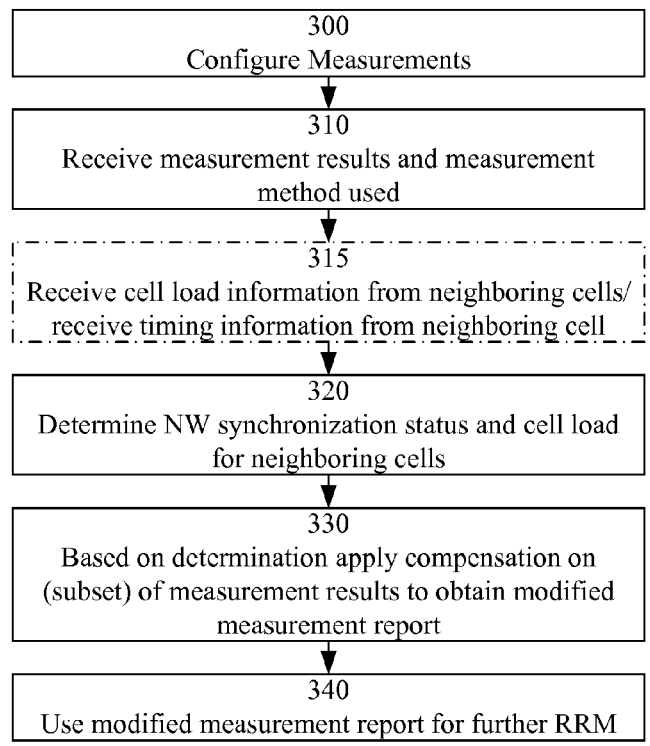

FIG. 7 shows a flow chart over the NW node embodiment C.

(300) The NW node configures measurement quantity to measure and report to the camping/connected devices (measurement configuration message).

(310) The NW node receives measurement reports (mobility management measurement reports) from the respective devices, together with used measurement method used for respective cell in the device measurement set.

(315) Optionally the NW node receives cell load information (experienced cell load) and timing information (time synchronization metric) from neighboring cell over (for instance) the X2 interface.

(320) NW node may instead of (315) determine NW sync status (time synchronization metric) and/or cell load (experienced cell load) autonomously.

(330) Based on information (315) and (320) the NW node determines whether a subset of the measurement reports need to be compensated according to described above, in order to determine a modified measurement report.

(340) The NW node then uses the modified measurement reports in mobility management procedures, e.g. in the further RRM processing and decisions (HO for instance).

NW Configurable Switching of Measurement Method (D)

In this embodiment, the NW node configures the device with which RSRQ measurement method to use. For example the NW node may signal one bit (0 or 1) to configure UE to use first method (e.g. 0) or second method (e.g. 1). The NW may also signal additional measurement parameters associated with the RSRQ measurement for first and second methods i.e. parameter values may depend upon the method.

Examples of measurement parameters are signal hysteresis, time to trigger, time hysteresis, layer 3 filtering coefficient etc. The configuration can be done during initial setup of a call or during a call or at the time of cell change (e.g. handover—HO). The configuration may be applicable to all cells in the device measurement set, but may also be configured independently for respective cell in the measurement set. For instance, the old RSRQ measurement may be used for cells with low load or low signal quality, or neighboring cells (e.g. low C/I, SNR, SINR, CRS Es/Iot or PSS/SSS Es/Iot≤−3 dB, say) while the new may be used for high load cells or cells with high load or high signal quality (e.g. C/I, SNR, SINR, CRS Es/Iot or PSS/SSS Es/Iot>−3 dB, say) (serving cell and other strong neighboring cells).

So the UE is allowed to use old and new RSRQ measurement method but controlled by the network. The network configures UE whether to use first (old) or second (new) RSRQ. It may also be pre-defined that by default (i.e. if no indication is received from the NW node) the UE is required to use a specified method e.g. first method. The network may also use information related to radio characteristics such as cell load, synchronization status of the cells/NW, radio environment etc to determine which measurement method is most suited for doing RSRQ measurement. The NW node can determine these radio characteristics as described herein.

Figure 8:
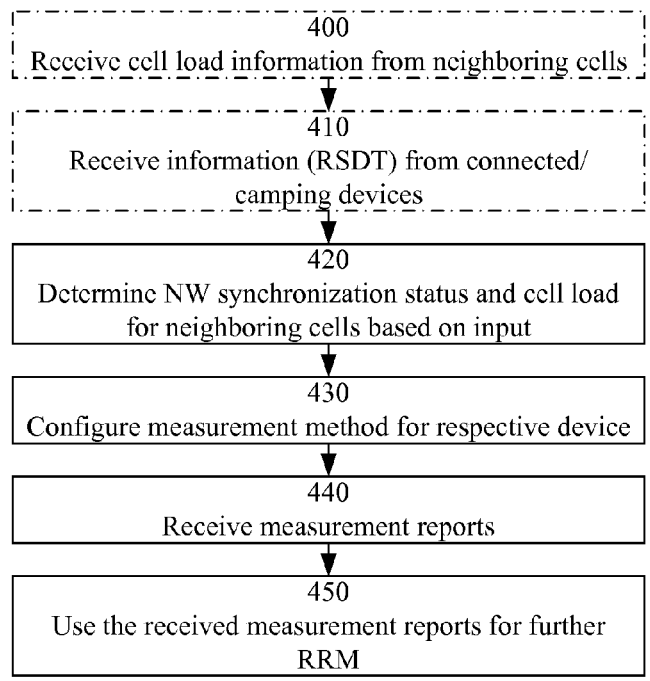

FIG. 8 shows a flow chart over NW node embodiment D. The flow chart illustrates a method of a network node of a cellular communication network connectable to one or more wireless communication devices, the method comprising (for each of one or more cells of the cellular communication network):

(400) optionally the NW node receives cell load information (experienced cell load) from neighboring cells (acquiring an experienced cell load of the cell).

(410) optionally the NW node receive timing information (time synchronization metric) for neighboring cells from devices (RSTD measurement for instance) (acquiring a time synchronization metric indicative of a time synchronization between the cell and one or more other cells of the cellular communication network).

(420) the NW node determines the NW synchronization status (time synchronization metric) and cell load (experienced cell load) for the serving (or optionally neighboring) cell(s).

(430) Based on information (400)-(420) the NW node configures measurement method (via measurement configuration messages) to use for respective device (transmitting a respective measurement configuration message to at least one of the wireless communication devices, wherein each measurement configuration message may comprise an instruction that the wireless communication device should use a particular mobility management measurement method, which may be selected from a group of available mobility management measurement methods comprising a first mobility management measurement method wherein measurements are made based on a first number of symbols and a second mobility management measurement method wherein measurements are made based on a second number of symbols, and wherein the selection may be based on one or more of the experienced cell load and the time synchronization metric).

(440) The NW node receives measurement reports (mobility management measurement reports) from camping/connected devices (receiving one or more mobility management measurement reports from respective ones of the wireless communication devices, wherein each mobility management measurement report comprises an indication of a result of mobility management measurements performed by the respective wireless communication device).

(450) Received measurement reports are used in mobility management procedures, e.g. in further RRM processing/handling/decision (using the result of mobility management measurements in a mobility management procedure).

Application to SON/MDT (E, NW node) (F, Device)

This embodiment may be applicable for SON (Self Organized Network) or MDT (Minimization of Drive Test) i.e. used for network planning. These features especially MDT is used by the NW node to configure the UE to log and store measurements performed on cells. The UE then reports the logged measurements along with timestamp and location when measurement was done to the NW node. The NW node uses the received results for statistical purposes, for example, one or more tasks related to the network planning e g tuning of or setting up of cell parameters such as transmit power, cell BW, number of antennas etc. The device is configured (e.g. by measurement configuration messages) by the network to log RSRQ using both old and new RSRQ measurement method and log e.g. their difference in log scale/ratio in linear scale/mismatch between two values, either as a background measurement in idle mode or other low activity state like CELL_PCH or URA_PCH in HSPA (every time the device wakes up from DRX) or in connected mode in LTE (RRC_connected) or CELL_DCH state in HSPA. This requires the UE to perform the RSRQ from the same cell using both first measurement method and second measurement method. The UE may perform first and second RSRQ at the same time or at different times or at partially overlapping time.

The UE reports (e.g. in mobility management measurement reports) the measurement data to the network node which then uses it for network planning, gathering statistics for coverage, current cell load etc. in this embodiment, the device may report both RSRQ, or a difference between the RSRQ of serving/camping cell and detected neighboring cells.

The NW node based on the results may also decide whether to configure the UE with the first measurement method or with the second measurement method i.e. method in embodiment in section 6.4 may take into account these results. For example the network node may configure the UE to use only first method in certain location or for measuring on certain cells case provided the mismatch between first and second RSRQ (as indicated by reports) is larger than the threshold e.g. larger than 3 dB.

The measurement reports may be transmitted on regular basis or on event basis, for instance if the discrepancy between the measurements is above a certain threshold (say more than 1 dB). The discrepancy may be measured and reported based on instantaneous measurements (one "snap shot", or based on filtered measurements (i.e. average (weighted or equal weight of linear or logarithm of RSRQ)) over a certain time constant, configured by the NW node or defined in the standard.

Figure 9:
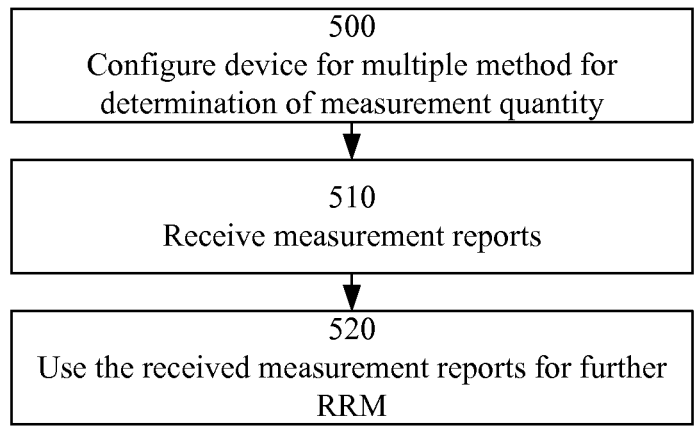

FIG. 9 shows a flow chart over a NW node embodiment (E)

(500) The NW node configures (a subset of) connected/camping devices for multiple measurement methods for determination of a certain measurement quantity (e.g. RSRQ).

(510) The NW node receives measurement reports for (the subset of) connected/camping configured as in (510).

(520) Received measurement reports are used in further RRM processing/handling/decision/NW planning/statistical purposes, etc.

Figure 10:
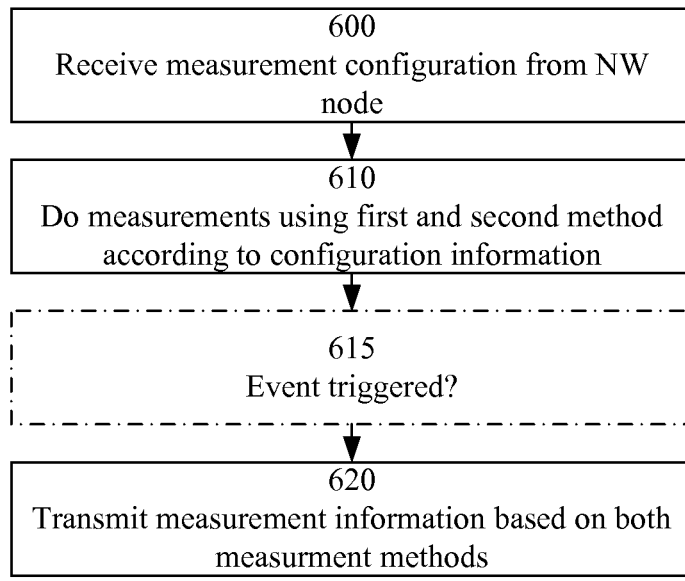

FIG. 10 shows corresponding device embodiment (F)

(600) The device receives SON/MDT measurement configuration from the serving/camping NW node.

(610) The device does measurement using both first and second measurement method according to received configuration information (615) optionally the device determines whether an event is triggered. The event may be that the discrepancy between the result for the first and second measurement method differs more than a first threshold, as described above.

(620) A Measurement report is transmitted to NW node including information associated with both measurement methods (this may be triggered by an event (615), or transmitted on regular basis).

In the above description we have exemplified with measuring a certain signal quality using two different method, each uses different received signals for the determination, but the invention also covers the case with three or more measurement methods.

FIG. 10 may also be used to illustrate a method of a wireless communication device connectable to a cellular communication network, which may be applied in association with the method of the network node as illustrated in FIG. 8.

In this case, the method of FIG. 10 may be understood to comprise (for each of one or more cells of the cellular communication network):

(600) receiving a measurement configuration message from a network node of the cellular communication network, wherein the measurement configuration message comprises an instruction that the wireless communication device should use a particular mobility management measurement method, the particular mobility management measurement method selected from a group of available mobility management measurement methods comprising a first mobility management measurement method wherein measurements are made based on a first number of symbols and a second mobility management measurement method wherein measurements are made based on a second number of symbols (compare with (430) of FIG. 8)

(610) performing mobility management measurements according to the particular mobility management measurement method.

(620) transmitting a mobility management measurement report to the network node of the cellular communication network comprising an indication of a result of the performed mobility management measurements (compare with (440) of FIG. 10).

Method in UE of Signaling Capability of Switching RSRQ Measurement Methods

According to this embodiment the UE which is capable of switching between first and second measurement methods for measuring RSRQ (e.g. as described earlier herein) may also inform the network node that it supports such capability (capability indication message). The UE may report the capability to NW via RRC signaling (e.g. to eNB, RNC, BSC etc). The UE may also signal the capability to positioning node (e.g. E-SMLC) via LTE positioning protocol (LPP). The UE may also include additional information in the capability indication message which may comprise of one or more of the following:

UE is capable of only autonomously switching between the first and second measurement methods.

UE is capable of autonomously switching between the first and second measurement methods as well as informing which method is used for measuring RSRQ.

UE is capable of receiving configuration and using it for using first or second method for RSRQ measurements.

UE is capable of performing RSRQ using any of the above principles for cells on any one or more of serving carrier, for inter-frequency carrier, inter-RAT carrier, multicarrier/CA, CoMP, positioning etc.

HD-FDD capable UE is also capable of adjusting its positioning measurement procedure e.g. according to principles explained herein.

The acquired capability information may be used by the receiving network node and/or positioning node for taking one or more radio operation tasks or radio resource management actions. Examples of radio operation tasks are decision whether to configure the UE with the first measurement method or with the second measurement method, whether to apply the compensation to account for the mismatch between first and second type of measurement etc.

The UE may send the capability information to the network node and/or positioning node in any of the following manner:

Proactive reporting without receiving any explicit request from the network node (e.g. serving or any target network node)

Reporting upon receiving any explicit request from the network node (e.g. serving or any target network node)

The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in carrier aggregation (CA), primary component carrier (PCC) change in PCC etc).

In case of proactive reporting the UE may report its capability during one or more of the following occasions:

During initial setup or call setup e.g. when establishing the RRC connection

During cell change e.g. handover, primary carrier change in multi-carrier operation, PCell change in multi-carrier operation, RRC re-establishment, RRC connection release with redirection etc.

Example Advantages of Some Embodiments

Reported RSRQ reflects true and consistent quality of a cell even though radio characteristics may vary over time.

The UE implementation and network implementation have more freedom to choose the most suitable method.

The UE and NW can optimize and use the most appropriate RSRQ depending upon radio characteristics/scenarios.

Figure 11:
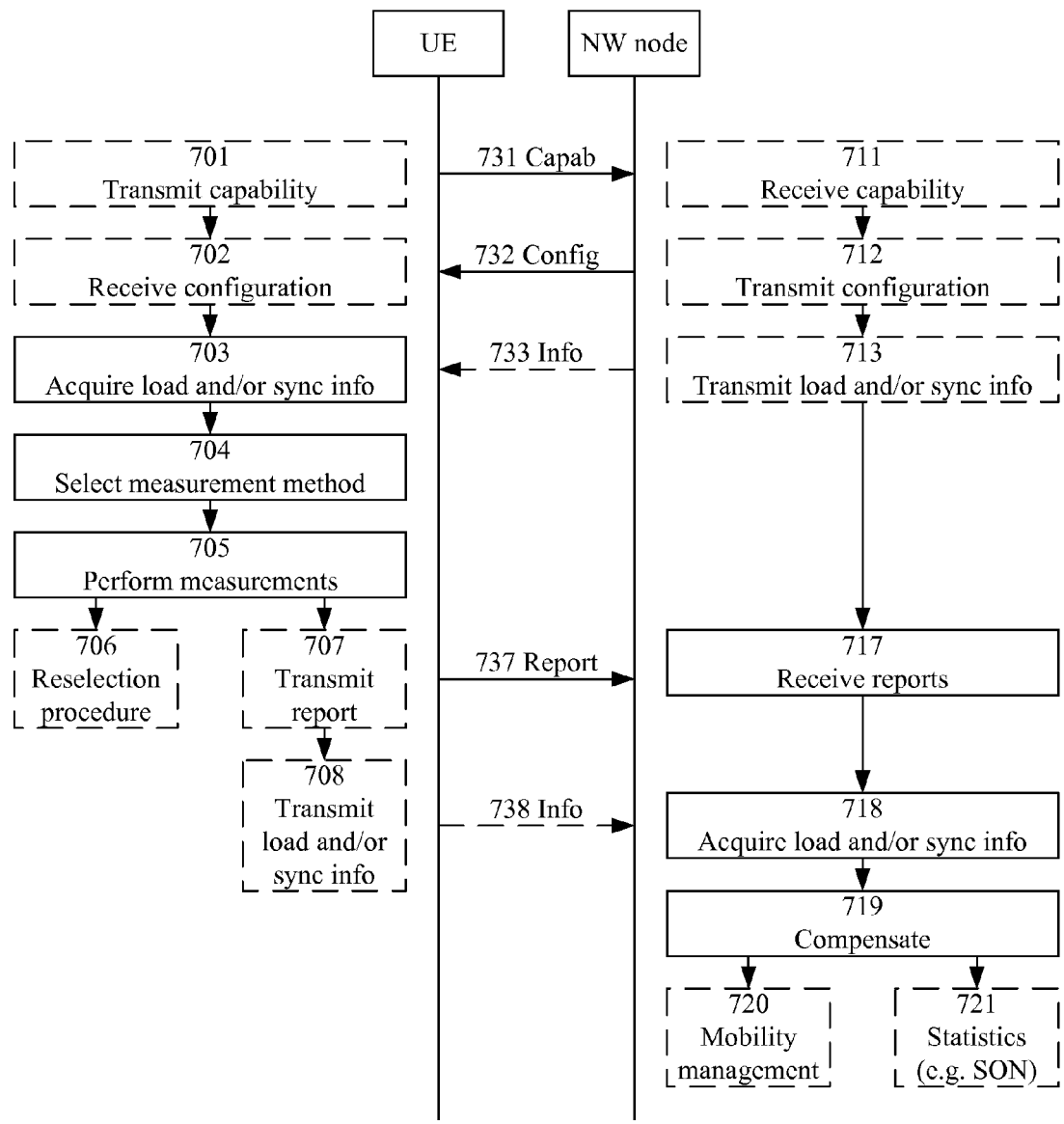
FIG. 11 is a combined flowchart and signaling diagram illustrating example method steps and example signals according to some embodiments.

FIG. 11 is a combined flow chart and signaling diagram illustrating some embodiments of the invention.

A UE may transmit its capability (731 Capab) to a NW node in step 701 and the capability may be received by the NW node in step 711 (compare e.g. with "Method in UE of signaling capability of switching RSRQ measurement methods" above).

The NW node may transmit a configuration (732 Config) of mobility management measurement method to the UE in step 712 and the configuration may be received by the UE in step 702 (compare e.g. with steps 430 and 600).

Optionally, the NW node may transmit load and/or sync information (733 Info) to the UE in step 713 and the information may be received (acquired) by the UE in step 703. These steps are particularly applicable in the context of FIGS. 5 and 6 where the UE selects mobility management measurement method, which selection is illustrated in step 704. These steps may be omitted if the NW node selects mobility management measurement method and the configuration (732 Config) of mobility management measurement method specifies which method to use.

In step 705, the UE performs the measurements according to the selected mobility management measurement method (compare e.g. with step 610).

The result of the measurements may be reported (737 Report) by the UE to the NW node in step 707 and the report may be received by the NW node in step 717 (compare e.g. with steps 620 and 440).

Optionally, the UE may also transmit load and/or sync information (738 Info) to the NW node in step 708 and the information may be received by the NW node in step 718. In some embodiments, step 718 (load and/or sync acquired from UE or from another source) may be performed before step 711. Then, the NW node may select mobility management measurement method based on the information and the configuration (732 Config) of mobility management measurement method specifies which method to use.

Compensation of measurements (e.g. based on the information of step 718) may be performed in step 719.

The measurements may be used for mobility management as illustrated in step 720 for handover (compare e.g. with step 450) and in step 706 for cell re-selection, and/or as statistics (e.g. for SON) as illustrated in step 721.

Figure 12:
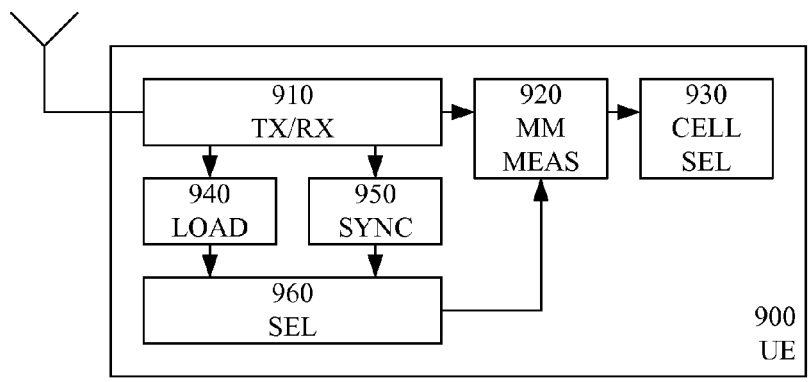
FIGS. 12-13 are block diagrams illustrating example arrangements according to some embodiments.

FIG. 12 is a schematic block diagram illustrating an arrangement for a wireless communication device (UE) 900 connectable to a cellular communication network according to some embodiments. The arrangement may, for example, be adapted to perform any of the methods as described in connection with FIGS. 5, 6, 10 and 11 (UE part).

The arrangement comprises a mobility management measurement unit (MM MEAS) 920, a transmitter and a receiver (transceiver TX/RX) 910.

The mobility management measurement unit may be adapted to perform mobility management measurements according to a selected method, and the transceiver may be adapted to transmit and receive various signals, messages, etc. as described above.

The arrangement may also comprise a selector (SEL) 960, a selection unit (CELL SEL) 930 and at least one of a cell load acquiring unit (LOAD) 940 and a time synchronization metric acquiring unit (SYNC) 950.

The cell load acquiring unit may be adapted to acquiring an experienced cell load of the cell, the time synchronization metric acquiring unit may be adapted to acquire a time synchronization metric indicative of a time synchronization between the cell and one or more other cells of the cellular communication network, and the selector may be adapted to select a mobility management measurement method based on at least one of the experienced cell load and the time synchronization metric.

The selection unit may be adapted to perform a cell reselection procedure based on the mobility management measurements.

In some embodiments:

the receiver is adapted to receive a measurement configuration message from a network node of the cellular communication network, wherein the measurement configuration message comprises an instruction that the wireless communication device should use a particular mobility management measurement method, the particular mobility management measurement method selected from a group of available mobility management measurement methods comprising a first mobility management measurement method wherein measurements are made based on a first number of symbols and a second mobility management measurement method wherein measurements are made based on a second number of symbols, the mobility management measurement unit is adapted to perform mobility management measurements according to the particular mobility management measurement method, and the transmitter is adapted to transmit a mobility management measurement report to the network node of the cellular communication network comprising an indication of a result of the performed mobility management measurements.

Figure 13:
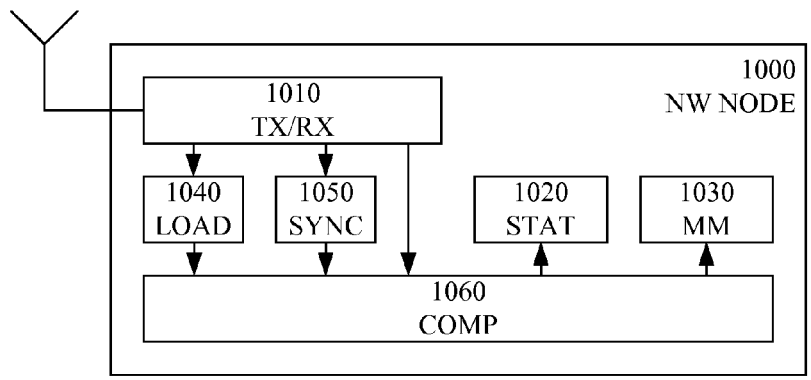

FIG. 13 is a schematic block diagram illustrating an arrangement for a network node (NW NODE) 1000 of a cellular communication network connectable to one or more wireless communication devices according to some embodiments. The arrangement may, for example, be adapted to perform any of the methods as described in connection with FIGS. 7, 8, 9 and 11 (NW node part).

The arrangement comprises a receiver and a transmitter (transceiver TX/RX) 1010, and at least one of a cell load acquiring unit (LOAD) 1040 and a time synchronization metric acquiring unit (SYNC) 1050.

The cell load acquiring unit may be adapted to acquire an experienced cell load of the cell and the time synchronization metric acquiring unit may be adapted to acquire a time synchronization metric indicative of a time synchronization between the cell and one or more other cells of the cellular communication network. The transceiver may be adapted to transmit and receive various signals, messages, etc. as described above The arrangement may also comprise a compensator (COMP) 1060, which may be adapted to compensate at least one measurement result indication received by the transceiver based on at least one of the experienced cell load and the time synchronization metric.

In some embodiments, the arrangement may further comprise a mobility management unit (MM) 1030 adapted to use a (possibly compensated) measurement result indication received by the transceiver in a mobility management procedure.

In some embodiments, the arrangement may further comprise a statistical unit (STAT) 1020 adapted to use a (possibly compensated) measurement result indication received by the transceiver for statistical purposes.

In some embodiments:

the cell load acquiring unit is adapted to acquiring an experienced cell load of the cell, the time synchronization metric acquiring unit is adapted to acquire a time synchronization metric indicative of a time synchronization between the cell and one or more other cells of the cellular communication network, transmitter is adapted to transmit a respective measurement configuration message to at least one of the wireless communication devices, wherein each measurement configuration message comprises an instruction that the wireless communication device should use a particular mobility management measurement method, the particular mobility management measurement method selected from a group of available mobility management measurement methods comprising a first mobility management measurement method wherein measurements are made based on a first number of symbols and a second mobility management measurement method wherein measurements are made based on a second number of symbols, and the receiver is adapted to receive one or more mobility management measurement reports from respective ones of the wireless communication devices, wherein each mobility management measurement report comprises an indication of a result of mobility management measurements performed by the respective wireless communication device.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device—e.g. a UE—or a network node—e.g. a NodeB) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 14:
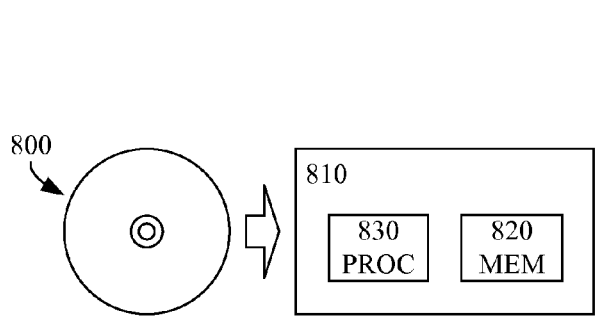
FIG. 14 is a schematic drawing illustrating a computer readable medium according to some embodiments.

According to some embodiments, a computer program product comprises a computer readable medium such as, for example, a diskette or a CD-ROM as exemplified by 800 in FIG. 14. The computer readable medium may have stored thereon a computer program comprising program instructions. The computer program may be loadable into a data-processing unit (PROC) 830, which may, for example, be comprised in a mobile terminal or a network node (810). When loaded into the data-processing unit, the computer program may be stored in a memory (MEM) 820 associated with or integral to the data-processing unit. According to some embodiments, the computer program may, when loaded into and run by the data-processing unit, cause the data-processing unit to execute method steps according to, for example, any of the methods described herein.

Figure 15:
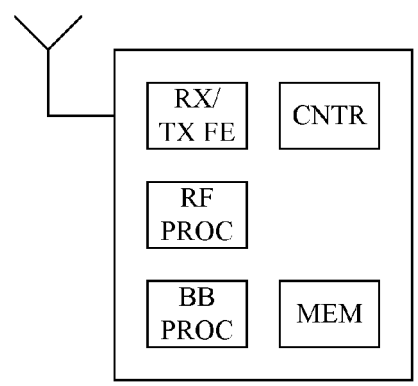
FIG. 15 is a block diagram illustrating an example arrangement according to some embodiments.

FIG. 15 is a schematic block diagram illustrating an arrangement for a wireless communication device or a network node according to some embodiments.

The example arrangement comprises a transceiver front-end (RX/TX FE), a controller (CNTR), a radio frequency processing unit (RF PROC), a baseband processing unit (BB PROC) and a memory (MEM). The hardware parts illustrated in FIG. 15 may be adapted to cooperate in implementing the functional blocks presented in connection to FIGS. 12 and 13 in any suitable manner.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting.

The simulation results presented in FIGS. 1-4 will now be explained in greater detail. FIGS. 1-4 illustrate RSRQ Link Simulation Results with RSSI Measurements in all Symbols.

A new definition of RSRQ where UE measures RSSI in all OFDM symbols in a subframe has been proposed in 3GPP standardization discussions, and a way forward paper for doing link and system simulations to compare the difference between existing and new RSRQ was approved in the 3GPP document R4-134475, "Way forward on RSRQ definition", by Blackberry, Intel, Qualcomm, Verizon.

In FIGS. 1-4, link simulation results are provided to observe the mismatch between the two different RSRQ definitions.

As for simulation assumptions with regard to FIGS. 1-4, the link simulation parameters used for obtaining RSRQ results were based on the WF paper in R4-134475, "Way forward on RSRQ definition". A summary of parameters is also shown in table 1 below. The link simulation results are expressed in terms of CDF of mismatch between new RSRQ and old RSRQ in dB. The results are shown for synchronous and asynchronous cases under PDSCH loads of 25% and 100%.

Figure 2:
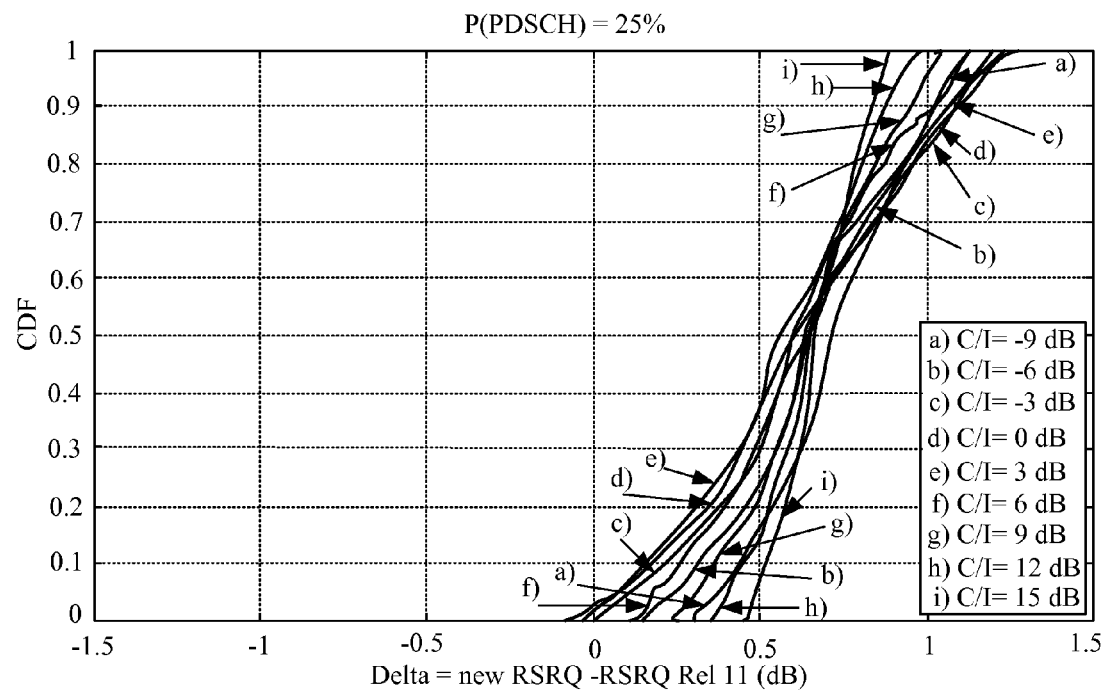

The synchronous case is shown in FIGS. 1 and 2 for PDSCH load=100% and 25% respectively. FIG. 1 shows mismatch between new RSRQ and old RSRQ in synchronized network with PDSCH=100% load and AWGN. FIG. 2 shows mismatch between new RSRQ and old RSRQ in synchronized network with PDSCH=25% load and AWGN.

It may be observed that under high PDSCH load (100%) the mismatch between new and old RSRQ is negligible. But under low load PDSCH load (25%) there is a bias. That is, the new RSRQ has a positive bias with respect to the old RSRQ. However the bias is not so large given that the RSRQ measurement accuracy is within ±2.5 dB.

Figure 3:
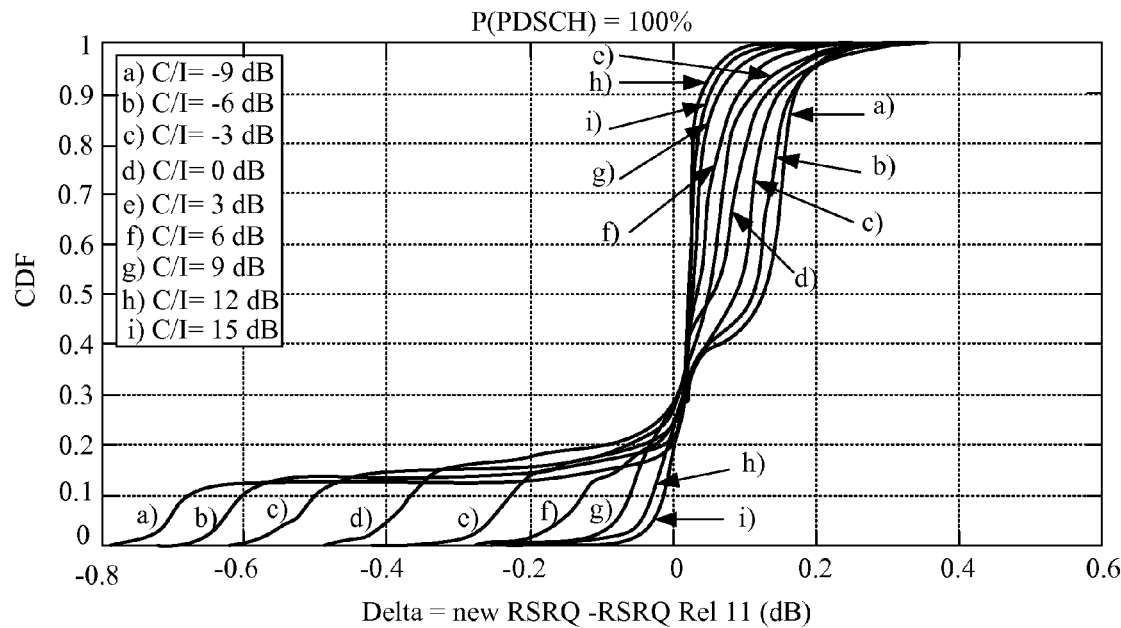
Figure 4:
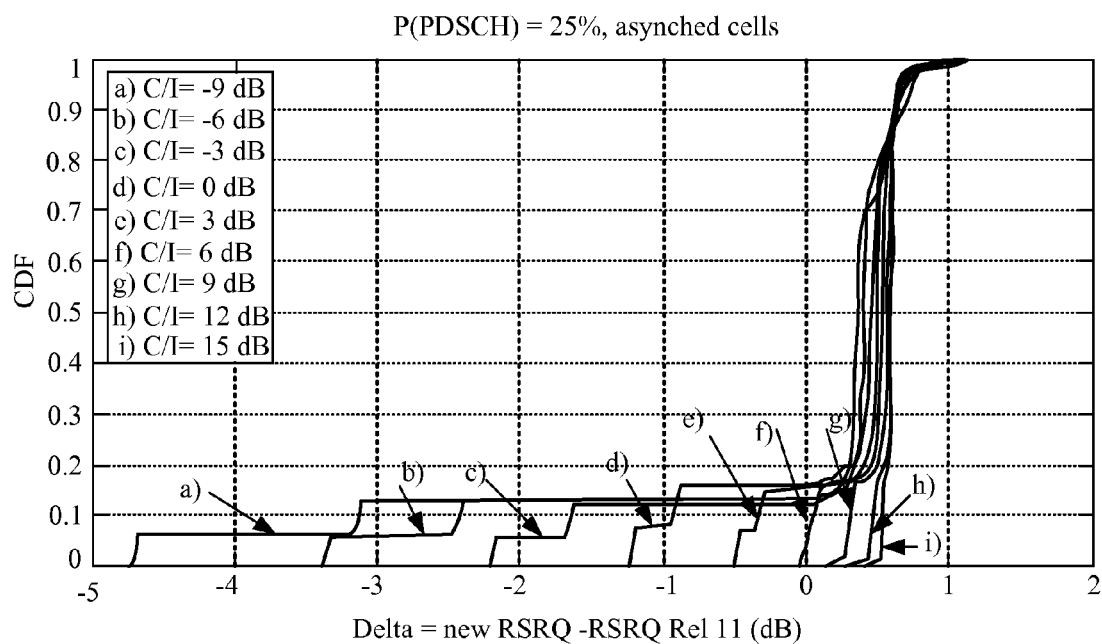

The asynchronous case is shown in FIGS. 3 and 4 for PDSCH load=100% and 25% respectively. FIG. 3 shows mismatch between new RSRQ and old RSRQ in asynchronous network with PDSCH=100% load, AWGN and time offset between 2 cells=randomly selected between 0 to 7 symbols. FIG. 4 shows mismatch between new RSRQ and old RSRQ in asynchronous network with PDSCH=25% load, AWGN and random offset between cell1 and cell2.

It may be observed that in asynchronous case under high PDSCH load (100%), the mismatch between new and old RSRQ is relatively small and within the RSRQ measurement tolerance/accuracy. But under low load PDSCH load (25%) there is a significant bias especially at SINR (i.e. Es/Iot) below 0 dB. In this case the new RSRQ has in particular more significant negative bias with respect to old RSRQ at low SINR. The bias is well outside the RSRQ measurement accuracy of ±2.5 dB.

TABLE 1

Link simulation parameters for RSRQ measurement results

| Parameters | Value | Comments |
| --- | --- | --- |
| Measurement bandwidth | 6 RBs | |
| System bandwidth of cells | 6 RBs | |
| Number of cells | 2 | Cell1(measured); cell2 (neighbor) |
| Synchronization level: 2 cases | Synchronized cells | Perfectly synchronized |
| | Asynchronous cells | Time offset = random between 0-7 symbols |
| PDSCH transmission probability: 2 cases | 25% | In both cells |
| | 100% | In both cells |
| Control channel space | 3 OFDM symbols | |
| L1 measurement period | 200 ms | |
| Measurement sampling rate | 6 snaps shots over 200 ms | One snap shot = 2 ms long every 40 ms. |
| L3 filtering | disabled | |
| Transmit antenna | 1 | |
| Receive antennas | 2 | Receive diversity rule as defined in TS 36.214. Both antennas with equal gain, no correlation between them. |
| DRX | OFF | |
| Propagation conditions | AWGN | |
| Old RSRQ | RSSI based on CRS symbols | RSSI is measured as in release 8 |
| New RSRQ | RSSI based on all symbols 0-7 | RSSI is measured in all OFDM symbols in a subframe |

Thus, the mismatch very much depends upon the combination of load (PDSCH load) and level of network synchronization:

Under synchronous case the mismatch is very small especially under high load.

Under asynchronous case the mismatch can be very substantial under low load and moderate or low SINR.

The invention claimed is:

1. A method of a network node of a cellular communication network connectable to one or more wireless communication devices, the method comprising, for each of one or more cells of the cellular communication network:

transmitting a respective measurement configuration message, comprised in a radio resource control (RRC)

configuration message, to at least one of the wireless communication devices, wherein each measurement configuration message comprises an instruction that the wireless communication device should use a particular signal quality measurement method, the particular signal quality measurement method being selected from a group of available signal quality measurement methods comprising a first signal quality measurement method wherein measurements are made based on a first number of symbols and a second signal quality measurement method wherein measurements are made based on a second number of symbols, wherein the first number of symbols is a subset of the second number of symbols, wherein the second number of symbols comprises all orthogonal frequency division multiplex (OFDM) symbols in a subframe of the received signal and the first number of symbols comprises only orthogonal frequency division multiplex (OFDM) symbols in a subframe of the received signal that carry cell-specific reference signals (CRS); and receiving one or more signal quality measurement reports from respective ones of the wireless communication devices, wherein each signal quality measurement report comprises an indication of a result of signal quality measurements performed by the respective wireless communication device.

2. The method of claim 1, further comprising:
acquiring at least one of:
an experienced cell load of the cell; and
a time synchronization metric indicative of a time synchronization between the cell and one or more other cells of the cellular communication network.

3. The method of claim 2 wherein the particular signal quality measurement method is selected based on one or more of the experienced cell load and the time synchronization metric.

4. The method of claim 1, wherein the signal quality measurement methods comprise methods to measure a received signal strength indication (RSSI) and calculate a reference signal received quality (RSRQ) value based on the measured received signal strength indication.

5. The method of claim 1, wherein the particular signal quality measurement method is to be performed by the respective wireless communication device in one or more of the following states:
Radio Resource Control (RRC) idle state;
Radio Resource Control connected state;
Idle mode;
Universal terrestrial radio access network Registration Area Paging Channel (URA_PCH) state;
Cell Paging Channel (CELL_PCH) state;
Forward Access Channel (CELL_FACH) state; and
Dedicated Channel (CELL_DCH) state.

6. The method of claim 1, further comprising using the result of signal quality measurements for one or more of:
a mobility management procedure;
positioning of the wireless communication device;
a cell change;
a handover;
minimization of drive tests (MDT);
network planning, configuration and tuning of radio network parameters;
self-organizing network (SON);
network monitoring;
interference management;
determination and management of load; and
inter-cell interference control.

7. The method of claim 1, further comprising receiving a capability indication message from the wireless communication device, wherein the capability indication message is indicative of a collection of signal quality measurement methods supported by the wireless communication device, wherein the collection comprises at least the first and second signal quality measurement methods.

8. The method of claim 1, wherein the signal quality measurements are mobility management measurements, the signal quality measurement methods are mobility management measurement methods and the signal quality measurement reports are mobility management measurement reports.

9. The method according to claim 1, wherein the first and second signal quality measurement method is for measuring received signal strength indicator (RSSI) for reference signal received quality (RSRQ).

10. A method of a wireless communication device connectable to a cellular communication network, the method comprising, for each of one or more cells of the cellular communication network:
receiving a measurement configuration message, comprised in a Radio Resource Control (RRC) configuration message, from a network node of the cellular communication network, wherein the measurement configuration message comprises an instruction that the wireless communication device should use a particular signal quality measurement method, the particular signal quality measurement method selected from a group of available signal quality measurement methods comprising a first signal quality measurement method wherein measurements are made based on a first number of symbols and a second signal quality measurement method wherein measurements are made based on a second number of symbols, wherein the first number of symbols is a subset of the second number of symbols, wherein the second number of symbols comprises all orthogonal frequency division multiplex (OFDM) symbols in a subframe of the received signal and the first number of symbols comprises only orthogonal frequency division multiplex (OFDM) symbols in a subframe of the received signal that carry cell-specific reference signals (CRS); and
performing signal quality measurements according to the particular signal quality measurement method.

11. The method of claim 10 further comprising one or more of:
transmitting a signal quality measurement report to the network node of the cellular communication network comprising an indication of a result of the performed signal quality measurements;
using the performed signal quality measurements for cell selection;
using the performed signal quality measurements for cell reselection;
using the performed signal quality measurements for cell change;
using the performed signal quality measurements for positioning;
storing or logging results of one or more of the performed signal quality measurements;
using the performed signal quality measurements for Radio Resource Control (RRC) connection release with re-direction; and
using the performed signal quality measurements for RRC connection re-establishment.

12. The method of claim 10, wherein the signal quality measurement methods comprise methods to measure a received signal strength indication (RSSI) and calculate a reference signal received signal quality (RSRQ) value based on the measured received signal strength indication.

13. The method of claim 10, further comprising performing the particular signal quality measurement method in one or more of the following states:
Radio Resource Control (RRC) idle state;
Radio Resource Control connected state;
Idle mode;
Universal terrestrial radio access network Registration Area Paging Channel (URA_PCH) state;
Cell Paging Channel (CELL_PCH) state;
Forward Access Channel (CELL_FACH) state; and
Dedicated Channel (CELL_DCH) state.

14. The method of claim 10, further comprising transmitting a capability indication message to the network node of the cellular communication network, wherein the capability indication message is indicative of a collection of signal quality measurement methods supported by the wireless communication device, wherein the collection comprises the first and second signal quality measurement methods.

15. The method of claim 10, wherein the signal quality measurements are mobility management measurements, the signal quality measurement methods are mobility management measurement methods and the signal quality measurement reports are mobility management measurement reports.

16. The method of claim 10, wherein the first and second signal quality measurement method is for measuring received signal strength indicator (RSSI) for reference signal received quality (RSRQ).

17. A nontransitory computer readable medium, having thereon a computer program comprising program instructions, the computer program being loadable into a data-processing unit and adapted to cause the data-processing unit to execute a method when the computer program is run by the data-processing unit wherein the method is of a network node of a cellular communication network connectable to one or more wireless communication devices, the method comprising, for each of one or more cells of the cellular communication network:
transmitting a respective measurement configuration message, comprised in a radio resource control (RRC) configuration message, to at least one of the wireless communication devices, wherein each measurement configuration message comprises an instruction that the wireless communication device should use a particular signal quality measurement method, the particular signal quality measurement method being selected from a group of available signal quality measurement methods comprising a first signal quality measurement method wherein measurements are made based on a first number of symbols and a second signal quality measurement method wherein measurements are made based on a second number of symbols, wherein the first number of symbols is a subset of the second number of symbols, wherein the second number of symbols comprises all orthogonal frequency division multiplex (OFDM) symbols in a subframe of the received signal and the first number of symbols comprises only orthogonal frequency division multiplex (OFDM) symbols in a subframe of the received signal that carry cell-specific reference signals (CRS); and
receiving one or more signal quality measurement reports from respective ones of the wireless communication devices, wherein each signal quality measurement report comprises an indication of a result of signal quality measurements performed by the respective wireless communication device.

18. An arrangement of a network node of a cellular communication network connectable to one or more wireless communication devices, the arrangement comprising a receiver and a transmitter, wherein, for each of one or more cells of the cellular communication network:
the transmitter is adapted to transmit a respective measurement configuration message, comprised in a Radio Resource Control (RRC) configuration message, to at least one of the wireless communication devices, wherein each measurement configuration message comprises an instruction that the wireless communication device should use a particular signal quality measurement method, the particular signal quality measurement method being selected from a group of available signal quality measurement methods comprising a first signal quality measurement method wherein measurements are made based on a first number of symbols and a second signal quality measurement method wherein measurements are made based on a second number of symbols, wherein the first number of symbols is a subset of the second number of symbols, wherein the second number of symbols comprises all orthogonal frequency division multiplex (OFDM) symbols in a subframe of the received signal and the first number of symbols comprises only orthogonal frequency division multiplex (OFDM) symbols in a subframe of the received signal that carry cell-specific reference signals (CRS); and
the receiver is adapted to receive one or more signal quality measurement reports from respective ones of the wireless communication devices, wherein each signal quality measurement report comprises an indication of a result of signal quality measurements performed by the respective wireless communication device.

19. The arrangement of claim 18 wherein the arrangement is a mobility management arrangement.

20. A network node for a cellular communication network comprising the arrangement of claim 18.

21. An arrangement of a wireless communication device connectable to a cellular communication network, the arrangement comprising a signal quality measurement unit and a receiver, wherein, for each of one or more cells of the cellular communication network:
the receiver is adapted to receive a measurement configuration message, comprised in a Radio Resource Control (RRC) configuration message from a network node of the cellular communication network, wherein the measurement configuration message comprises an instruction that the wireless communication device should use a particular signal quality measurement method, the particular signal quality measurement method selected from a group of available signal quality measurement methods comprising a first signal quality measurement method wherein measurements are made based on a first number of symbols and a second signal quality measurement method wherein measurements are made based on a second number of symbols, wherein the first number of symbols is a subset of the second number of symbols, wherein the second number of symbols comprises all orthogonal frequency division multiplex (OFDM) symbols in a subframe of the received signal and the first number of symbols comprises only orthogonal frequency division multiplex (OFDM) symbols in a subframe of the received signal that carry cell-specific reference signals (CRS); and the signal quality measurement unit is adapted to perform signal quality measurements according to the particular signal quality measurement method.

22. The arrangement of claim 21 wherein the signal quality measurement unit is a mobility management unit, the signal quality measurements are mobility management measurements and the signal quality measurement methods are mobility management measurement methods.

23. A wireless communication device comprising the arrangement of claim 21.

24. The method of claim 21, wherein the first and second signal quality measurement method is for measuring received signal strength indicator (RSSI) for reference signal received quality (RSRQ).

* * * * *

UNITED STATES PATENT AND TRADEMARK OFFICE
CERTIFICATE OF CORRECTION

PATENT NO. : 10,009,782 B2
APPLICATION NO. : 15/025145
DATED : June 26, 2018
INVENTOR(S) : Kazmi et al.

Page 1 of 1

It is certified that error appears in the above-identified patent and that said Letters Patent is hereby corrected as shown below:

On the Title Page

Item (72), under "Inventors", in Column 1, Line 2, delete "Bjarred (SE)" and insert -- Bjärred (SE) --, therefor.

In the Drawings

In Fig. 8, Sheet 4 of 7, in Step "410", Line 1, delete "(RSDT)" and insert -- (RSTD) --, therefor.

In the Specification

In Column 1, Line 31, delete "Receiver" and insert -- Received --, therefor.

In Column 16, Line 7, delete "(RRU)" and insert -- (RRU), --, therefor.

In the Claims

In Column 33, Line 14, in Claim 24, delete "method" and insert -- arrangement --, therefor.

Signed and Sealed this
Nineteenth Day of February, 2019

Andrei Iancu
*Director of the United States Patent and Trademark Office*